United States Patent [19]

Sell

[11] 3,905,026

[45] Sept. 9, 1975

[54] LARGE, HIGH SPEED TWO DIMENSIONAL CORE MEMORY

[75] Inventor: Victor L. Sell, Santa Monica, Calif.

[73] Assignee: Ampex Corporation, Redwood City, Calif.

[22] Filed: Nov. 15, 1973

[21] Appl. No.: 416,097

[52] U.S. Cl. ................ 340/174 PA, 340/174 AD, 340/174 DA, 340/174 DC; 340/174 M; 340/174 RC; 340/174 SC; 340/174 TC; 340/174 WA

[51] Int. Cl. ........................ G11c 5/08; G11c 11/06

[58] Field of Search.... 340/174 M, 174 TB, 174 PA

[56] References Cited

UNITED STATES PATENTS 3,631,412 12/1971 Harding........................ 340/174 PA

*Primary Examiner*—James W. Moffitt

[57] ABSTRACT

A large, high speed core memory includes in excess of one million highly stable, closedly spaced cores arranged in a single homogeneous continuously wired two dimensional, two wire array without need for temperature compensation, temperature gradient heat uniformization, forced conduction, uniform placement on a storage plate or heat sinking plate, liquid cooling or air conditioning. Highly temperature stable, low coercivity cores operate with low drive current in combination with precise temporal control of large magnitude, short duration drive currents causing extremely fast, abbreviated flux switching to attain optimum stability of core switching characteristics with respect to variations in temperature, drive current and core physical characteristics while minimizing power dissipation to facilitate the use of integrated circuits. The factors of using a large two dimensional array, large drive currents, driving the cores in a major hysteresis loop, short duration partial flux switching, and temperature independent cores all react with and enable one another to permit the fabrication of a large, economical, very fast core memory. In a multistate mode of operation the partial select digit write current has a duration selected from a plurality of discrete durations in accordance with information being stored. During a subsequent readout, the stored information is indicated by the number of discrete time intervals during which the voltage magnitude of output switching signal remains above a predetermined threshold.

31 Claims, 16 Drawing Figures

PATENTED SEP 9 1975

3,905,026

SHEET 2

LARGE, HIGH SPEED TWO DIMENSIONAL CORE MEMORY

BACKGROUND OF THE INVENTION

1. Field of the Invention

This invention relates to computer memories and more particularly to a large, uncompensated planar core memory utilizing highly stable, high density cores connected in a two dimensional configuration and having a read write cycle time below 400 nsec. for 18 mil. O.D. cores and as low as 150 Nsec. for 13 mil. O.D. cores.

2. History of the Prior Art

Core memories have long been used for storage of computer information and consist of arrays of bistable toroidal magnetic cores in which flux is magnetized to a first state to indicate a "zero" and to a second state to indicate a "one". Magnetomotive forces for switching a core are developed by passing selected drive currents through one or more drive lines which thread the core. A core has a "knee" or magnitude of coercive force, Hc, which depends upon the particular characteristics of each core, but typically lies in the range of 200–500 milliampere turns for present day ferrite cores. A core begins to switch only in response to a magnetomotive force in excess of Hc.

While many different wiring configurations have been devised, and utilized in the past, a configuration known as three wire — 3D has become more popular at the present time. Such a configuration is described in co-pending application, Ser. No. 186,621, filed Oct. 5, 1971 and now U.S. Pat. No. 3,825,907, "Planar Core Memory Stack". In such a memory arrangement, the basic building unit is a planar stack which typically contains 16 mats, with each mat having 4096 cores arranged in a 64 × 64 array. Each planar stack thus contains 4096 words with 16 bits in each word and must have external connections for at least 64 drive control conductors, 32 sense conductors, and 16 sense line center taps which are used to provide inhibit currents. Since a 2 million bit memory requires 32 of these memory planes, a tremendous number of interconnections must be made in connecting the memory planes to proper driving and sensing circuitry. These interconnections not only increase manufacturing labor but also represent one of the most probable sources of memory failure. The reliability of the magnetic cores and solid state circuitry is typically much better than that of these interconnection terminals. Other disadvantages of a three dimensional memory include large material costs, large labor costs, large labor and equipment expenses for testing and quality control, less than optimum cycle times, large temperature gradients throughout a memory system, large power consumption and substantial maintenance expenses. The labor required to string the third wire of a three wire memory typically equals that required to string the first two. A 3-D memory requires full flux switching while operating in a minor B-H loop in order to attain sufficient uniformity of sensed signals in different states to get approximate cancellation of the delta noise generated by the many cores on a sense line.

Another memory configuration is a two dimensional configuration known as a linear select or a word organized memory. It has been recognized that this configuration offers certain advantages by permitting increased word currents and decreased digit currents. In these arrangements, pairs of digit lines are generally connected together by a pair of matched resistors and driven through a center tap. A differential sense amplifier is connected to the two digit lines. The common mode rejection of the sense amplifier and the balanced connecting of digit lines improves recovery time after a write operation. A different word line is connected to each of the two digit lines of a pair so that only one bit position is switched by the coincidence of a word and digit write currents. The linear select configuration eliminates the problem of a delta noise accumulation or cancellation since only one driven core couples each digit-sense line, permits a smaller number of cores to couple each digit-sense line and permits less than all of the flux of a core to be switched in a major B-H loop.

However, disadvantages associated with linear select memories have heretofore limited their popularity. Such memories have been relatively expensive because of the large number of current drivers and control switches which are required. The requirement for careful control of and compensation for temperature gradients has further added to the cost and lack of acceptance of this type of arrangement. Furthermore, present day computer systems are adapted to receive small data words at rapid intervals and do not take good advantage of the ability of a linear select memory to simultaneously store or recall a large number of bits.

SUMMARY OF THE INVENTION

A single core per bit toroidal core memory in accordance with the invention is free of special compensation circuitry for temperature gradients and includes at least one homogeneous two dimensional array of bistable magnetic cores arranged in a configuration of 2,048 cores or 1,024 cores by 512 cores. The cores have particularly stable switching characteristics with respect to drive current magnitude and temperature and when switching generate an output signal having a minimum total energy content near room temperature and higher energy content at both higher and lower temperatures. A core is switched to the "one" stable state by the coincidence of a time abbreviated word current having a magnitude greater than that required for half selection full flux switching and an abbreviated digit current having a magnitude about equal to that required for half selection full flux switching. Sensing is accomplished by driving all of the cores on a word line with a single time abbreviated word current which is of greater magnitude than the total write current and sufficient to insure that all cores on the word line are switched to the zero state and sensing the output switching pulse of each core on a digit line. Time abbreviation of the write current pulses interrupts the switching process before all of the flux of a core has been switched to the "one" state. A somewhat larger read current reshapes the curve shape of the output switching signal to produce a large amplitude, short duration signal with a fast, uniform peaking time, T*p*, and a fast switching time, T*s*. The short switching time permits the read current to also be time abbreviated and results in very fast memory operation. Operation in a large current magnitude major B-H loop with partial flux switching greatly improves the stability of the core output switching signal with respect to variations in current, temperature and core physical characteristics to permit the grading of cores to be eliminated when reasonably uniform cores are used. Such cores may be punched from extruded tape or manufactured by some other process providing uniformity of density and physical dimensions. The amount of rework required after wiring a magnetic array is also reduced.

As the number of bits in a memory becomes large, any problems associated with memory operation are inordinately accelerated. For instance, increased drive and sense line length increases the range of unpredictable times for signals traveling through the memory. Similarly, the full range of inspection controlled tolerances will be more closely approached for large memories and difficulties are compounded in the event that rework is required.

This invention provides a core memory configuration and operating mode wherein tolerances that may cause unsatisfactory memory operation are eliminated or broadened as much as possible and controlled in the most predictable manner possible. The linear select memory configuration eliminates all delta noise problems by driving only one core per sense-digit line. This configuration reduces the number of currents that must be time synchronized and amplitude controlled to one or two per core for writing and one for reading and readily lends itself to fully automatic stringing. The linear select configuration permits the temperature stable cores to be driven in an extremely fast, high current, partial flux major B-H loop which reduces to acceptable limit variations in switching characteristics that would be unacceptable in other memory configurations. The fast, partial flux switching operation switches only the fastest, most uniform flux of a core to enhance the switching speed and provide improved uniformity to make the fast switching possible. This operating mode lends itself to small cores which minimize physical dimensions and transmission delays to permit even faster operation. The fast read-write times reduce power consumption by as much as 75% over 3 wire 3D memories even though somewhat greater drive currents are used, thereby reducing power dissipation and reducing temperature problems to further improve stability. Even in a large memory individual core inspection may be eliminated with sufficient control of the core manufacturing process. The linear select configuration lends itself to the use of spare sense-digit and word lines to reduce any rework that may be required after stringing.

By using discrete time abbreviation of write currents, memory capacity is improved by switching each core to one of three, four or more states. The time relationship of the trailing edge of the output switching signal is detected during a destructive readout to determine the storage state of a core. During readout the state of the data register is repeatedly incremented so long as the output voltage signal is above a predetermined threshold and the state of the data register upon completion of a read operation indicates the information state of a read core. Use of four states permits each core to store the equivalent of two bits of information while the use of 8 states permits each core to store the equivalent of 3 bits of information. The number of states, S, required to store the equivalent of Q bits of information in each core is $S=2^Q$. Use of ten different states either within a single core or shared between two cores permits the direct storage of decimal information with no need for binary conversion.

BRIEF DESCRIPTION OF THE DRAWINGS

A better understanding of the invention may be had from a consideration of the detailed description taken in conjunction with the accompanying drawings in which.

DETAILED DESCRIPTION

Figure 1:
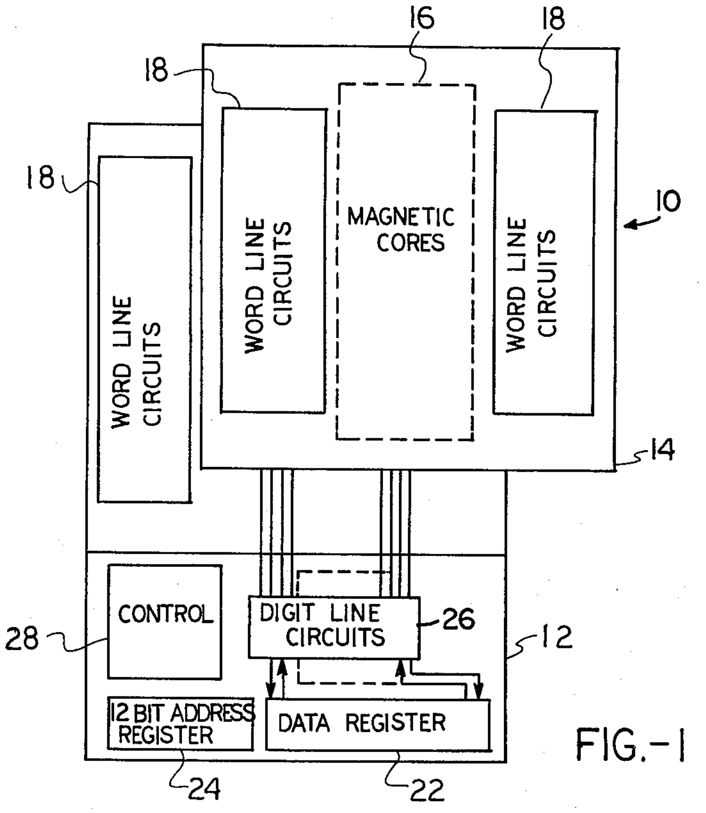
FIG. 1 is a partly block diagram, partly perspective representation of a memory in accordance with the invention showing the relationships of the major components.

As illustrated in FIG. 1, a memory 10 in accordance with the invention includes a lower circuit board 12 and an upper circuit board 14. Both circuit boards 12, 14 contain a homogeneous array of magnetic cores 16 as well as substantially identical word line circuitry 18 including read and write driver circuits and decoder circuits. However, lower circuit board 12 is somewhat larger and additionally includes a data register 22, an address register 24, digit line circuits 26 for sensing and driving the digit lines and system control circuitry 28. The data register 22 provides data storage associated with each digit line pair for storing data information read during a read cycle or written during a write cycle. Each array of cores 16 preferably has a configuration of 2,048 cores on each bit line and 1,024 cores on each word line but may have alternative configurations of 1,024 × 1,024, 2,048 × 512, 1,024 × 512 or any other configuration containing a large number of cores inductively coupled to each current axis. The cores of the array 16 are manufactured from highly temperature and B-H loop stable material. In a multi-state mode of operation, a selected discrete amount of flux for each switched core is driven to a write state in accordance with a data signal. During readout substantially all of the magnetic flux of a core is driven to a read state of magnetization and a voltage pulse is inductively induced by the switching of magnetic flux from the write state to the read state. The cores are highly stable with respect to normal variations in operating conditions and produce a switching pulse waveform which has a trailing edge with a discrete time relationship dependent upon the discrete amount of write flux stored by the core prior to reading. A sensing circuit responds to the discrete time relationship of the trailing edge of the read voltage pulse by generating a discrete output signal indicative of a particular one of several possible discrete storage states for the core.

Each memory element is thus able to store more than two states. For instance, a core which may be driven to one of 8 different states can operate as an octal digit and store the equivalent of 3 binary digits or bits of information. The information storage capacity of such a memory is thus increased by a factor of three over a conventional bistable core memory having the same number of cores.

Figure 2:
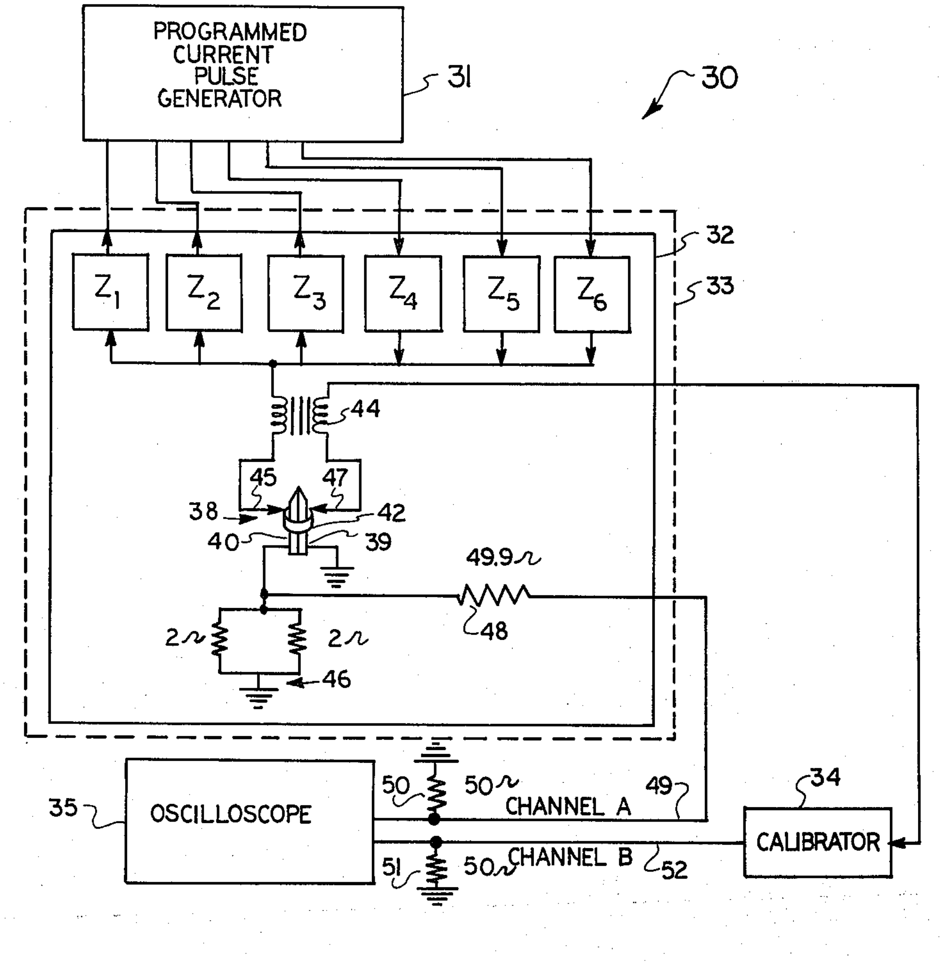
FIG. 2 is a schematic diagram of a circuit for operating a core in accordance with the invention.

An arrangement for observing the switching pulse waveform of a toroidal ferrite core is illustrated in FIG. 2. A switching system 30 includes a programmed current pulse generator 31, a jig 32 within a controlled temperature chamber 33, a calibrator 34 and an oscilloscope 35. The pulse generator 31 may be any suitable generator, such as a Model 1780A Programmed Current Pulse Generator manufactured by Computer Test Corp., which provides current pulses with selected, precisely controlled amplitudes, rise times and durations. Pulse generator 31 provides three separately controllable negative currents and three separate controllable positive currents.

The jig 32, which may be any suitable core test jig such as a Model 4033 Manual Core Jig manufactured by Computer Test Corporation, includes a probe 38 formed by insulated sense and drive conductors 39, 40 respectively which slidingly receive a core 42 for controlled switching. The jig 32 also includes six impedances $Z_1$–$Z_6$ which provide impedance matching terminations for the six current drive lines connecting the pulse generator 31 with the jig 32. The impedances $Z_1$–$Z_6$ typically include a series combination of 50 ohms resistance and several isolation diodes in parallel. The internal side of each impedance $Z_1$–$Z_6$ is connected to a first terminal of a first coil of a noise cancelling transformer 44. The opposite terminal of the first coil is connected through a sliding contact 45 to one end of drive conductor 40. The other end of drive conductor 40 is connected through one ohm of resistance 46 to ground. Resistance 46 permits the actual current through drive conductor 40 to be detected and displayed on the oscilloscope 35. One end of sense conductor 39 is connected to ground and the other end is connected through a sliding contact 47 to a second terminal of a second coil of transformer 44. A first terminal of the second coil is connected through the calibrator 34, which may be a Model 1085 calibrator manufactured by Computer Test Corp., to the oscilloscope 35. Calibrator 34 provides controlled amplification of sensed switching pulses. Sliding contacts 45 and 47 are raised and lowered to permit cores 42 to be placed on or removed from the probe 38 and transformer 44 cancels noise induced on the sense line due to capacitive and inductive coupling of current pulses on the drive line.

The nongrounded end of resistance 46 is connected through a 49.9 ohm resistor 48 and a coaxial cable 49 to channel A of oscilloscope 35. A 50 ohm termination resistor 50 is connected between the connection to the oscilloscope 35 and ground. A second termination resistor 51 is connected between the oscilloscope connection of a cable 52 interconnecting calibrator 34 and oscilloscope 35 and ground.

The core 42, in order to assure that the time relationship of the discrete switching pulse falls within acceptable tolerances, is extremely stable with respect to variations of current temperature and flux magnitude. One type of ferrite core which meets these requirements is described in patent application Ser. No. 289,126 filed Sept. 14, 1972 and now abandoned, for "Niobium Substituted Lithium Ferrite Memory Cores". This type of core is commercially available from Ampex Corporation under the designation TIN 1836 and TIN 1842. Another type of core which is suitable for use in accordance with this invention and is commercially available from Ampex Corporation under the designations TIN 2852, 1833, 1836, 1838, 1854, 1870 or 1340. The TIN 1836 or 1340 cores, are preferred for the application of a multistable memory as taught herein because of a combination of low coercive force and small size. The first two digits of a core designation number refers to the outside diameter in mils and the last two digits specify 10% of the coercive force in ampere-turns.

The TIN 1836 core is a relatively small, fast core having an outside diameter of 18 mils, an inside diameter of 11 mils and a thickness of 3.5 mils. It thus has a total volume of approximately 558 $mils^3$ and results in the switching of a relatively small amount of flux even under conditions of full flux switching.

Figure 3:
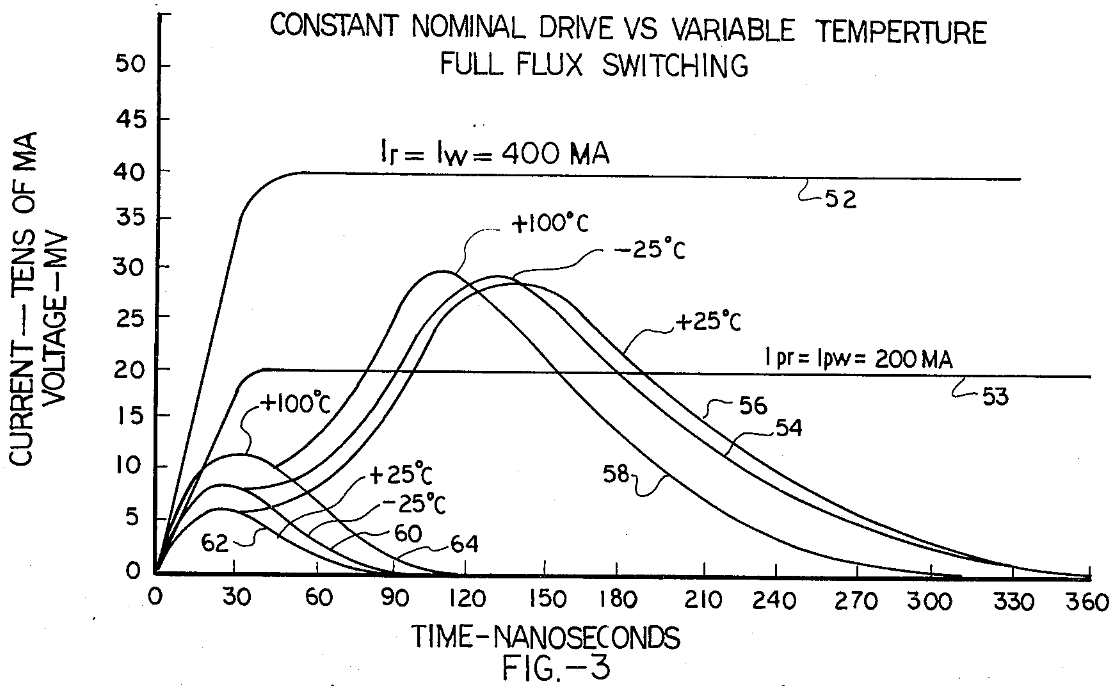
FIG. 3 is a graphical representation of full flux switching characteristics of a temperature independent core used in memories in accordance with the invention at different core temperatures.

The switching characteristics of the TIN 1836 core are illustrated in FIG. 3 for full flux switching under nominal drive conditions and various temperatures. Curve 52 represents the total magnitude of the opposite polarity 400ma read and write currents $I_r$ and $I_w$ which are each composed of two 200ma partial read and partial write currents $I_{pr}$ and $I_{pw}$ as represented by curve 53. Curves 54, 56 and 58 represent the sensed output voltage as the core switches from the one state to the zero state at temperatures of −25°C, +25°C and +100°C respectively. Similarly, curves 60, 62 and 64 represent the disturb noise $dV_z$ that is generated when 20 Ipw pulses of 200ma each are followed by a read current, $I_R$ = 400ma. The duration $t_d$ of the read pulse is sufficient to switch substantially all of the flux of a core to the zero state and is 500nsec. for the curves of FIG. 3. The actual switching time $t_s$ during which the output switching signal has a magnitude greater than 10% of its peak magnitude is about 290 nsec.

The core 42 is extremely temperature stable at or below room temperature as illustrated by curves 54, 56 and 60, 62 but is beginning to "walk" or switch under the influence of a partial select current at +100°C as illustrated by the early peaking of curve 58 and the large peak magnitude of disturb voltage curve 64. The −25°C curves 54, 60 have been found to have an undisturbed read one ouput signal peak magnitude of $uV_1$ = 29.8mv; a disturbed read one output signal peak magnitude of $dV_1$ = 28.6mv; a disturb noise peak magnitude of 8.8mv; a peaking time measured from the 10% magnitude point of the drive pulse of $t_p$ = 130 nsec.; and a knee or break current of $I_b$ = 237ma. $I_b$ or $I_k$ is the value of partial write current that causes the differences in the flux between the $dV_z$ (disturbed zero) and $uV_z$ (undisturbed zero) to increase sharply or the value of partial read current that causes the difference in flux between the $dV_1$ (disturbed one) and $uV_1$ (undisturbed one) states to increase sharply. The permanent flux of a core begins to switch in response to a drive current in excess of $I_b$. The −25°C switching curve 54 has characteristics of $uV_1$ = 29.8mv; $dV_1$ = 28.6mv; $dV_z$ = 8.8mv; $t_p$ = 130 nsec.; $t_s$ = 292 nsec.; and $I_b$ = 237 nsec. The +25°C switching curve 56 has characteristics of $uV_1$ = 29.1mv; $dV_1$ = 28.4mv; $dV_z$ = 6.5mv; $t_p$ = 135 nsec.; $t_s$ = 292 nsec. and $I_b$ = 232ma. The +100°C switching curve 58 has characteristics of $uV_1$ = 36.4mv and $dV_1$ = 30mv. Other characteristics are not applicable at 100°C because of walking. While the switching characteristics may vary slightly from core to core, the above values are typical.

The TIN 1836 core also remains quite stable at or below room temperature for full flux switching test conditions wherein the partial select disturb currents are raised about 10% to $Ipr = Ipw$ = 225ma and the full read and write currents are decreased 10% to $Ir = Iw$ = 360ma while 10–90% rise time $t_r$ remains 30 nsec. and $t_d$ remains 500 nsec. Under test conditions the switching characteristics are $uV_1$ = 22.2mv, $dV_1$ = 21.7mv, $dV_z$ = 9.8mv, $t_p$ = 135 nsec., $t_s$ = 315 nsec. and $I_b$ = 230ma at −25°C; $uV_1$ = 22.8mv, $dV_1$ = 20.8mv, $dV_z$ = 7.2mv, $t_p$ = 160mv, $t_s$ = 365mv, and $I_b$ = 227ma at +25°C; and $uV_1$ = 27.7mv, $dV_1$ = 11.1mv and $dV_z$ = 21mv at +100°C. The low $V_1$ of 11.1mv and high $dV_z$ of 21mv indicate that the core is "walking" quite badly at 100°C under the relatively adverse test conditions for full flux switching.

The use of an extremely temperature stable core insures that uniform memory operating characteristics will be preserved despite substantial temperature gradients that appear within a large array of 250,000 or more cores. For proper operation with economical components the minimum peak output voltage signal is desirably at least 70% of the maximum peak output voltage signal over the range −25°C to +75°C. For the 1836 temperature independent core the minimum peak output voltage signal occurs near +25°C and is about 93% of the maximum peak output voltage signal over the range −25°C to +100°C under conditions of full flux switching with the drive current equal to about 1.1 to 1.2 times the 360ma current required to drive the core to saturation. Furthermore, high speed reading requires a minimum variation in the peaking time over a wide temperature range. Variations in peaking time with respect to temperature are significantly dependent upon drive current rise time. The range of peaking times for the 1836 core can be adjusted to provide a time spread of less than 10 nsec. under conditions of partial flux switching for switching times $t_s$ less than 100 nsec. over a temperature range of −25°C to +100°C.

Figure 4:
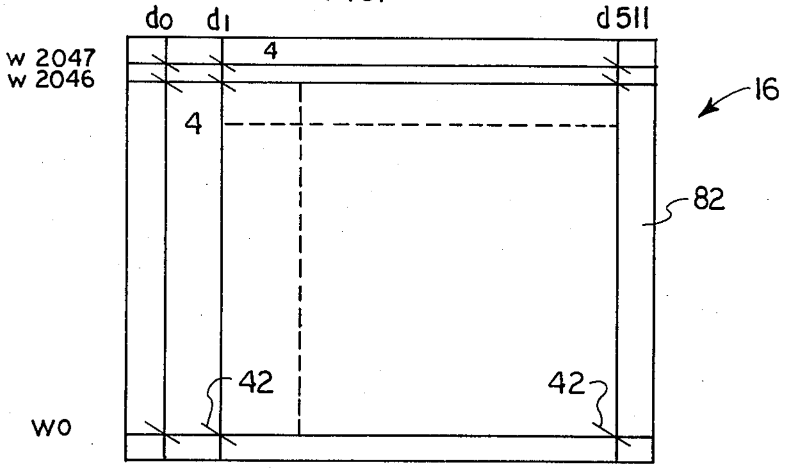
FIG. 4 is a schematic representation of an array of cores for a memory in accordance with the invention illustrating the wiring pattern and the homogenity of the disposition throughout the array.

As shown in FIG. 4, the magnetic array 16 includes 2048 words of 512 bits each in a homogeneous array of similarly oriented, substantially equally spaced magnetic memory cores 42. The cores 42 are threaded by longitudinal (vertical) digit line conductors $d0$ through $d511$ and latitudinal (horizontal) word line conductors $w0$ through $w2047$ with each core 42 inductively coupled to a unique combination of one digit line conductor and one word line conductor to form a two dimensional memory configuration commonly known as linear select. Each word and digit line conductor $w0$–$w2047$ and $d0$–$d511$ passes through the array 16 in a substantially straight line for maximum ease of threading. The closely spaced, high density 18 mil cores 42 are mounted on a substrate 82 on 8 or 10 mil centers along the digit lines, 16 or 18 mil centers along the word lines and are oriented at an acute angle of approximately 55° with respect to the digit lines. Alternatively, 13 mil cores may be mounted on approximately 7 mil centers along the digit lines and approximately 13 mil centers along the word lines. The array 16 thus has overall dimensions of approximately 20.5 inches by 20.5 inches for 18 mil cores on 10 mil centers along the digit lines.

It is characteristic of linear select memories that they may be driven to switch extremely fast and require a relatively large amount of expensive sensing circuitry. Thus, changes in circuit costs and performance characteristics may dictate rapid changes in the memory configuration. For instance, improvements in cost and performance of sensing circuitry may eventually permit the number of cores per digit line to be economically increased to as much as 32K or more to permit the coupling of more cores to each relatively expensive digit line sense and driver circuit. A larger memory size requires tighter tolerances on the sensing strobe time, however, due to a greater ambiguity of signal travel time through the memory 10.

It may be desirable to modify the number of digit lines in accordance with particular applications. For instance, the 512 digit lines can be divided into 16 words of 32 bits each, 32 words of 16 bits each or 64 words of 8 bits each. If a parity core is added for each 8 cores, as is common, a 32 × 18 = 576 bit line configuration may be desirable. Additional digit lines may be provided to serve as spares to be connected into the memory in the event one or more of the originally connected digit lines do not operate properly. Expensive restringing, which may itself cause memory damage, may thus be reduced or avoided.

While a high density linear select configuration requires more electronics than a commonly used 3 wire-3D configuration, it also has many advantages when arranged in a large array such as 2K by 1K or 2K by 512 as disclosed herein. From the standpoint of manufacturing the magnetic stack the number of wires that must be threaded through each core is reduced from 3 to 2 and only 2,048 + 1024 = 3074 insertions of a needle into a row of cores is necessary. The time to align a needle with a core is much greater than the time consumed per core when merely pushing a needle down a row of cores once alignment has been achieved or to pull a long length of wire through the cores and turn the needle around without tangling the wire. In a typical 3 wire-3D configuration using 64 × 64 = 4K bit mats, in 3 × 6 arrays of mats the number of needle insertions is approximately (64/3 + 64/6) (2M/4K) = 15,000 for the two drive wires alone. The number of sense inhibit line insertions is approximately 30,000. The number of insertions for the same number of cores is thus about 15 times as great for a 3 wire-3D configuration as for a large linear select configuration. This 15:1 advantage is attained without considering the greater memory capacity of each core in a multistate memory. Furthermore, a large two dimensional memory requires no interconnection of separately wired memory stacks as in the case of a 3D memory and both reliability and assembly time are greatly improved by the decrease in the number of interconnections.

The linear select core array 16 has many additional advantages from the standpoint of electrical operation power consumption and power dissipation. Any practical core memory arrangement requires one or two coincident drive currents and a relatively large number of bit control currents. For instance, a typical 3 wire-3D memory stack of 4K by 18 bits requires an X drive current, a Y drive current and 36 inhibit currents which have a time duration approximately 25% greater than the X and Y drive currents. The inhibit currents are used to cancel the effect of one address current and may or may not be activated, dependent upon the information content of data being stored. Assuming that on average, zeros are written half the time, 18 inhibit currents and 2 X-Y drive currents are required for each data write operation. The bit control currents thus represent the largest portion of power consumption in the memory. In addition, the X and Y drive and inhibit currents must be precisely synchronized to occur at the proper times and must be substantially equal at a predetermined magnitude which is sufficient to cancel the effect of a drive current without being large enough to induce core switching by itself. For proper operation of a 3 wire, 3D memory, any one current must not be capable of switching a core by itself and the resultant of two drive currents and one inhibit current must not change the state of a core. During readout the inhibit line pairs become differential sense lines and all cores of a word (one core per sense line pair) are driven to the zero state by the X and Y drive lines. Since each X and Y drive line passes through many cores in addition to cores in the word which is read out, special wiring and core orientation configurations must be used to obtain mutual cancellation of delta noise which is generated by the partial selection of these cores. However, the delta noise which is produced varies somewhat from core to core and also depends upon the logic state (1 or 0) of a core. It is thus impossible to get complete noise cancellation. Some of the steps taken to obtain an operating memory notwithstanding the noise problems include maximizing the switching output signal, strobing sense amplifiers as late as practical in a memory cycle to avoid the relatively low voltage level and short duration delta noise as much as possible, and driving the memory in a manner providing as large a signal-to-noise ratio as possible with the signal delayed to provide time separation from the noise.

Figure 5:
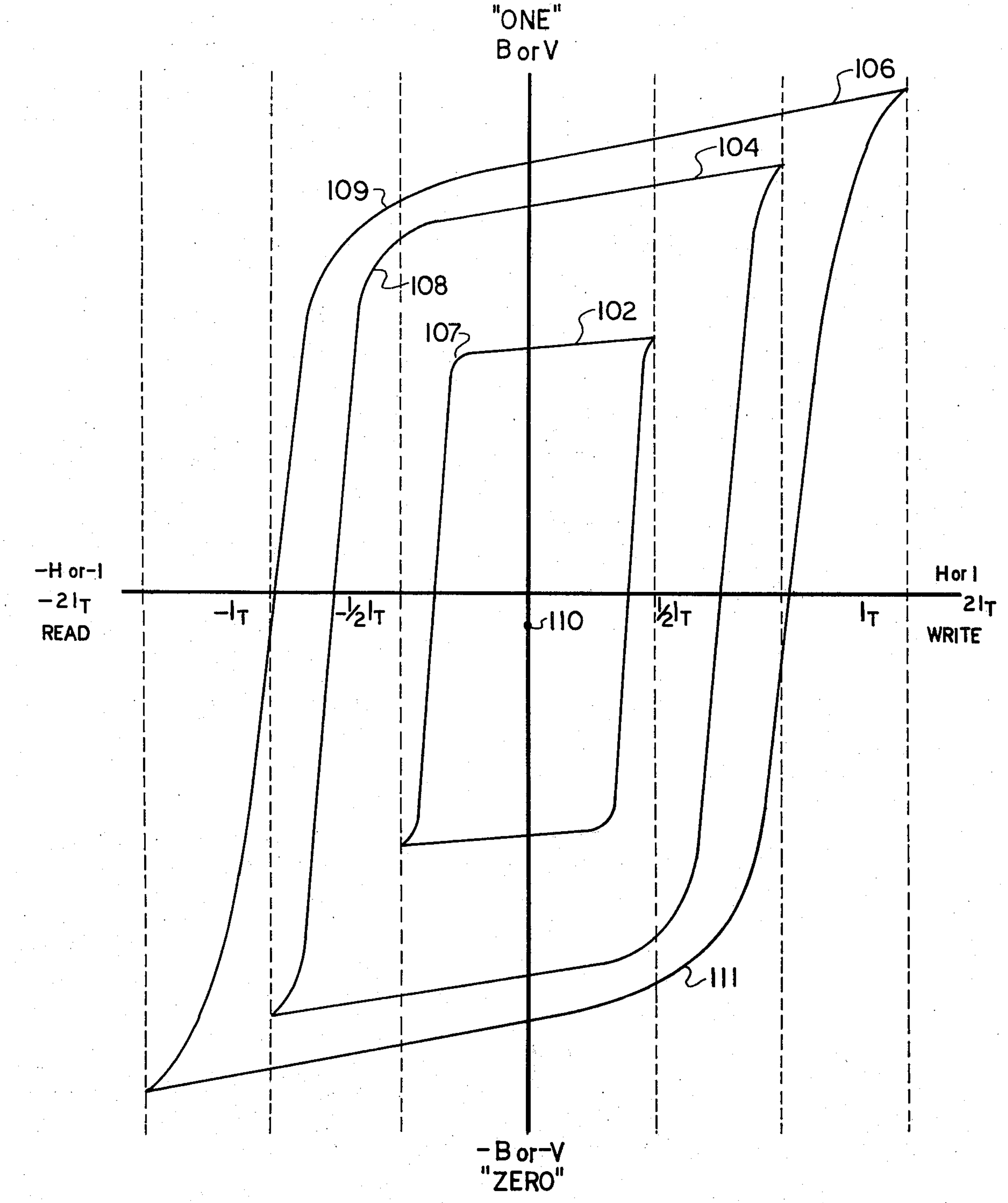
FIG. 5 is a graphical representation of B-H loops for ferrite cores.

Referring now to FIG. 5, a generalized set of B-H loops for a ferrite core include a minor loop 102, a transition loop 104 and a major loop 106. The abscissa is labeled both H and I since the magnetomotive force H in ampere turns is equal to the drive current I in amperes. Similarly, the ordinate is labeled both B and V since sensed output voltage $V = d\phi/at$ is generally proportional to flux density B.

A minor B-H loop is developed by alternately driving a core with relatively small currents of opposite polarity. As the current magnitude increases the B-H loop expands with the area enclosed by the loop and the value of the remanent flux density (the flux density remaining after termination of the drive current) increasing in particular. As the drive current is increased and the minor loop 102 expands a point is reached where further increments in drive current magnitude produce much smaller increments in loop area and remanent flux or flux density. This transition current is not really well defined but is represented by $I_T$ in FIG. 5 and transition loop 104 represents the B-H loop produced by driving a core with the transition current $I_T$. As the drive current is increased beyond $I_T$ major B-H loops are generated and increments in B-H loop expansion become quite small. Major loop 106 produced by a drive current $2I_T$ is extremely stable with respect to changes in temperature.

The minor loop 102 has a reasonably sharp knee 107. However, the knees 108, 109 for loops 104, 106 respectively become much less sharp as the drive current is increased to the transition region and beyond. Furthermore, the coercive force $H_c$ at the knee increases with drive current for minor loops but exhibits markedly less increase as the transition region is reached. As a result, the ratio current required to induce the coercive force to drive current becomes small for major B-H loops. For a good core this ratio typically has a maximum value of about 0.7 and occurs at a minor loop.

This ratio is particularly important for 3D memory operation where delta noise generated by many partially selected cores on a sense line must be cancelled. As the knee of a B-H loop is approached for a core in the one state during readout the delta noise voltage (represented by changes in B or V) increases sharply. This increase does not occur for cores in the zero state. Thus, in order to attain delta noise cancellation between cores in different information states it becomes necessary to operate the memory at a minor loop where the delta noise is not appreciably dependent upon the information state of a core.

However, with the linear select memory configuration delta noise is not a problem and it becomes possible to operate a memory on a major loop where extreme stability is attainable with respect to changes in current. Stability with respect to temperature change is also improved since a core responds to a temperature increase in a manner similar to a current increase.

For the TIN 1836 core the transition current $I_T$ occurs at about 450ma and beyond 500ma there is very little change in the B-H loop for changes in current. By driving the core with currents of 500ma or more in a time abbreviated partial flux mode extreme stability of peaking time $t_p$, switching time $t_s$ and peak voltage amplitude can be attained with respect to current changes and temperature changes. The portion of the flux that is switched is that which is most easily and most uniformly switched to further increase the stability of switching characteristics to the point where time variations do not represent an unacceptable percentage of the extremely short switching times involved. For example, a peaking time variation of 30 nsec. might be acceptable when the switching time is 300 nsec. but would be very substantial when the switching time is only 90 nsec. However, the required improvement in time uniformity is more than compensated for by the improvement in stability that is attainable with high coercivity short duration drive currents in accordance with this invention. Because only the most desirable portions of a core provide switching flux, core defects that might make a core unacceptable for conventional memory operation may not prevent operation in accordance with this invention. Thus yields can be improved by decreasing the standard deviation for variations in switching characteristics even more than the decrease in acceptable tolerances.

The rate at which flux switches or time for a fixed amount of flux to switch is approximately represented by the relationship $t_z = S_w/H - H_c$, where $t_z$ is the switching rate or switching time for a fixed amount of flux, $S_w$ is a switching constant dependent upon the physical characteristics of a particular core, H is the driving field or full drive current and $H_c$ is the coercive force. It can be seen that for H greater than $H_c$, the switching rate increases with driving current. Memory cycle time can thus be increased by increasing the drive current and by decreasing the amount of flux that is switched. As explained above, a 3D memory is severely limited with respect to both of these parameters. A practical 3D memory is typically limited to a total drive current of about 1.2 $H_c$. A 2D memory, on the other hand, may be driven in a linear select mode of operation wherein advantage is taken of these parameters by recognizing that during readout there is only one drive current coupling only one core per pair of digit or sense lines and no partial select current causing cumulative $dV_z$ noise and by recognizing during successive memory write operations that a core may receive multiple repeated digit line write currents, but only a single word line write current before the core is read. Since there is no need for partial disturb or delta noise cancellation a core may be written into the one state along a major B-H loop with only a portion and not all of the flux being switched. So long as a core is always driven to a saturated zero state during readout to provide a uniform reference point, the remanent flux for a logic 1 state may even be at a point 110 below the abscissa. This means that the remanent flux may have the same polarity for both the logic 1 and logic 0 states, but with the magnitude being less for the logic 1 state.

Since there is no partial select read current, the read current is limited only by the economics of the word drive circuitry and a minimum desired switching time $t_s$. The word line drive current is desirably between 570 and 640ma for the 1836 core. This is substantially greater than the minor loop to major loop transition current and drives the core extremely hard, thereby maintaining the magnitude and time characteristics of the switching output voltage signal extremely stable with respect to varying conditions such as temperature, core physical, dimension and composition characteristics, and drive current magnitude. Since the output voltage depends upon the rate of switching, $d\phi/dt$, the peak output voltage may be increased even while decreasing the amount of flux which is switched by increasing the drive current. Thus, by using partial flux switching and large read drive currents, read switching time $t_s$ can be made very fast with no sacrifice of signal peak magnitude.

The write switching time may be decreased also by increasing the word current to 300ma for a short pulse duration. This current drives a core beyond the knee 111 of even a major loop of the 1836 core and would be sufficient to walk cores which are to store logic 0 toward the 1 state if maintained for a long time duration or if repeated. By driving the cores which are to be switched to the 1 state with a coincident, additive, 200ma digit current, a portion of the remanent flux may be switched to the 1 state by driving a core which is to be switched very hard with a 500ma current for a very short period of time. This short duration is not sufficient for the 300ma pulse by itself to switch an appreciable amount of flux to the 1 state and the word current is never repeated prior to readout so that there can be no walking generated thereby. On the other hand, the partial select digit current, which may be repeatedly applied to a core before readout, is below the coercive force and in a direction tending to increase rather than decrease a read output signal when driving against a partially switched knee which may be softer than a saturation flux knee of a core in logic state 0.

The use of a short duration, large magnitude drive current while writing decreases cycle time not only by switching just a portion of the flux capacity of a core, but also by switching only the fastest switching flux near the center of a core. The effective magnetomotive (mmf) force, $H_1$ decreases with the distance from the current conductor. As a result the flux at the outer circumference of a core receives less switching force than that at the inner circumference, causing switching to initiate at the center and proceed toward the outer circumference. This flux near the outer circumference, and particularly at atomic discontinuities near the circumference thus switches relatively slow and tends to generate a long tail which is characteristic of an output switching pulse waveform for full flux switching. Partial flux switching with a hard, short duration drive pulse causes only the most rapidly switched flux near the center of a core to be switched, greatly reducing the tail of the output waveform and increasing the uniformity of the switching time $t_s$ of different cores over normal variations in drive current magnitude and core temperature. The predictability of the time relationship between the trailing edge of the output switching signal and the read drive current is thus greatly improved. This increase in the predictability of the output switching pulse as well as the increased uniformity thereof from core to core greatly reduces the number of cores which must be rejected as having unsatisfactory switching characteristics. In one test, 90% of a group of cores which had been rejected during a standard commercial inspection as being unsatisfactory for full flux switching were satisfactory for use in the linear select array under conditions of large drive currents and time abbreviated pulse switching. This mode of operation thus has the effect of tending to change variations in switching signal characteristics from a dependency on difficult to control parameters such as current, temperature and core physical characteristics to a dependency on pulse duration time which is easier to control.

In addition to faster operation, the linear select configuration requires less precise synchronization of drive pulses. A 3D memory requires 2 coincident currents during readout and as many as 3 coincident currents while writing. This coincidence requires overlapping and precise timing. A 2D memory requires only a single read current and only 2 write currents for each core, thereby easing synchronization requirements.

Figure 6:
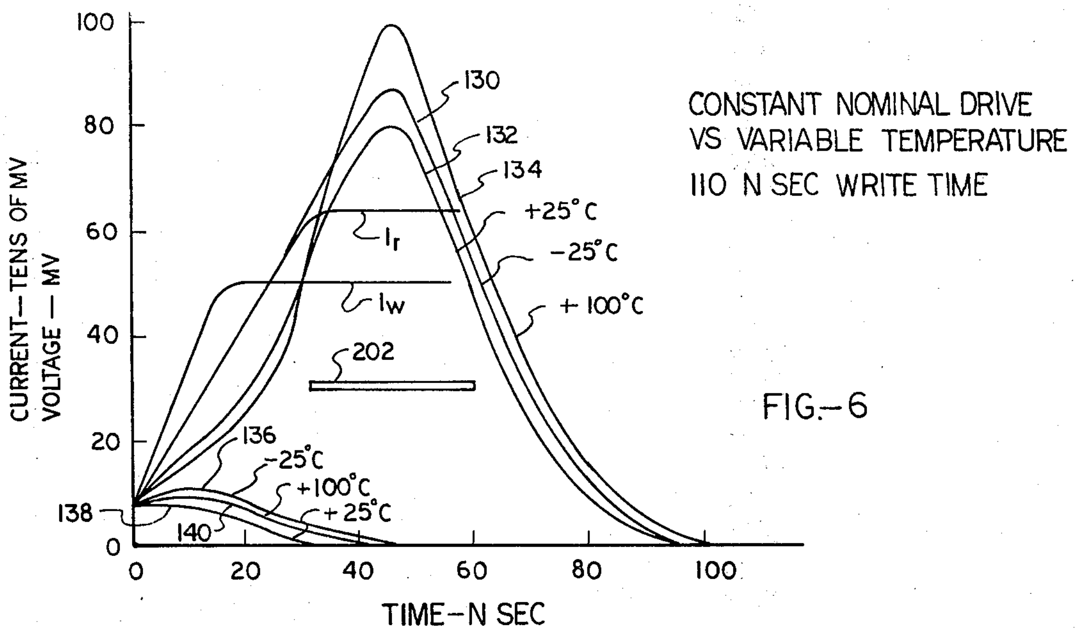
FIG. 6 is a graphical representation of switching characteristics for a temperature independent core used in memories in accordance with the invention at various temperatures under the conditions of nominal drive for a 110 nsec. duration.

The extreme stability of a TIN 1836 core with respect to both temperatures and current can be seen from FIGS. 6–9. FIG. 6 illustrates the switching characteristics of a TIN 1836 core under nominal drive conditions with a write pulse current duration of $t_d$ = 110 nsec. Curves 130, 132 and 134 represent the sensed output voltage pulse $uV_1$ as a TIN 1836 core switches from the one to the zero state at temperature of −25°C, +25°C and +100°C respectively. It can be seen that the worst case condition occurs at the intermediate temperature with the higher and lower temperature curves 134, 130 having both a greater peak magnitude and a greater enclosed area which is indicative of the total energy of the output switching pulse.

Curves 136, 138 and 140 at temperatures of −25°C, +25°C and +100°C respectively represent the output voltage pulse $dV_2$ induced by a read drive current after a TIN 1836 core has been driven to the zero state and subjected to a single partial write word pulse $Ipw1$ and 40 partial write digit pulses $Ipw2$. FIG. 6 illustrates the switching current waveforms for a read current characterized by $I_R$ = 630ma, $t_r$ = 30 nsec., $t_f$ = 20 nsec. and $t_d$ = 90 nsec.; for a total write current characterized by $Iw$ = 500ma, $t_r$ = 15 nsec., $t_f$ = 15 nsec. and $t_d$ = 110 nsec.; a word partial current characterized by $Ipw1$ = 300 ma, $t_r$ = 15 nsec., $t_f$ = 15 nsec. and $t_d$ = 110 nsec.; and a digit partial write current characterized by $Ipw2$ = 200ma, $t_r$ = 15 nsec., $t_f$ = 15 nsec. and $t_d$ = 110 nsec.

It can be seen that these time and current relationships produce extremely temperature stable switching curves with large amplitude, short duration switching pulses (note the different time and voltage scales used in FIG. 3 and FIGS. 6–9) and easily distinguishable noise pulses. The switching characteristics under these drive conditions are, for the −25°C curves 130, 136, $uV_1$ = 86.5mv, $dV_z$ = 9.5mv, $t_p$ = 45 nsec. and $t_s$ = 79 nsec.; for the +25°C curves 132, 138, $uV_1$ = 80mv peak, $dV_z$ = 8.6mv peak, and $t_p$ = 46 nsec.; and for the +100°C curves, $uV_1$ = 97.5mv peak, $dV_z$ = 9.5mv peak; $t_p$ = 47 nsec. and $t_s$ = 82 nsec.

Figures 7, 8:
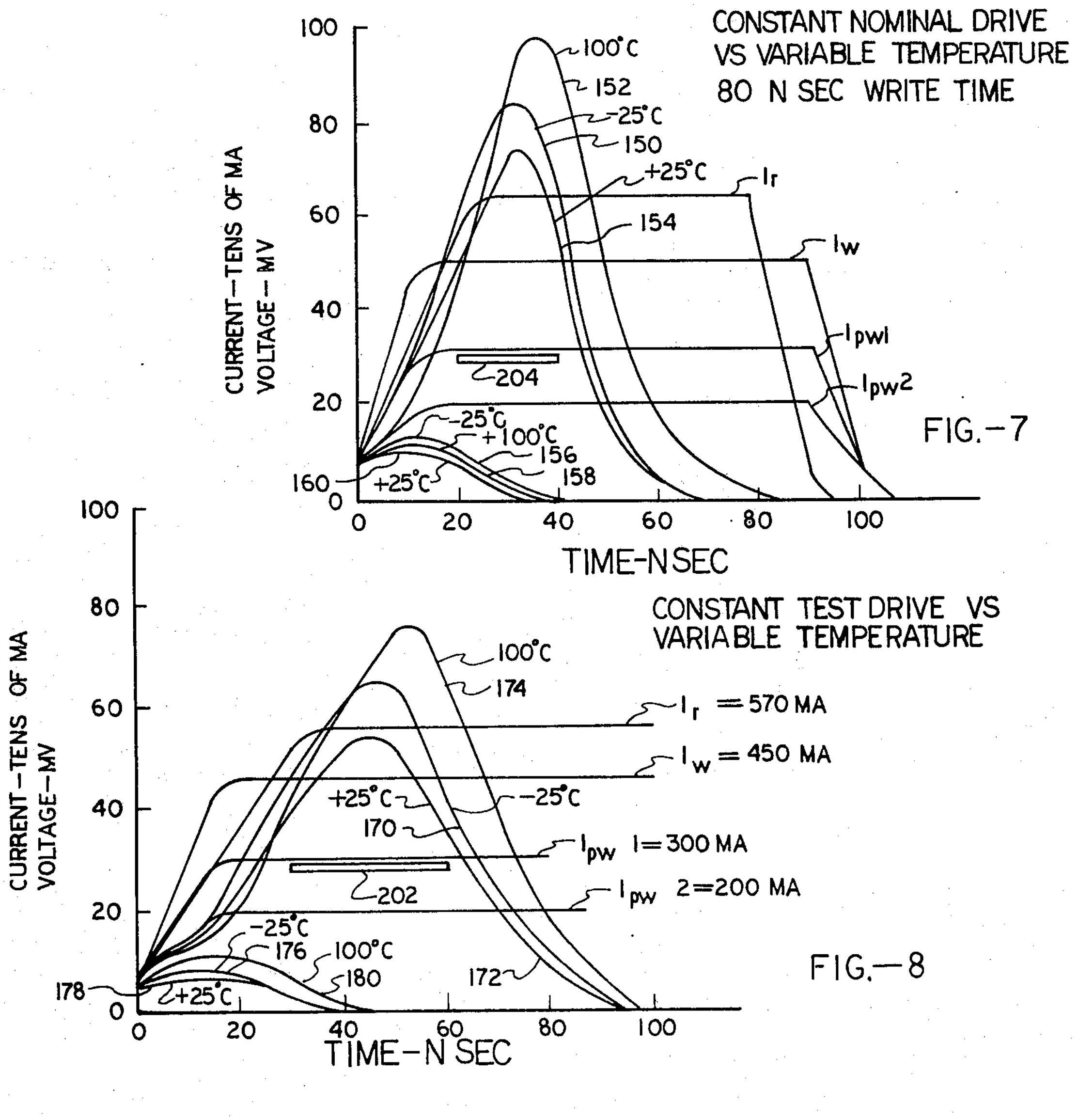
FIG. 7 is a graphical representation of switching characteristics for a temperature independent core used in memories in accordance with the invention at various temperatures under conditions of nominal drive for a 80 nsec. duration.
FIG. 8 is a graphical representation of full flux switching characteristics for a temperature independent core used in memories in accordance with the invention at various temperatures under conditions of test drive.

The continued stability of the core switching characteristics as the rise and fall times are shortened and the amount of switched flux is reduced is illustrated in FIG. 7 by curves 150, 152 and 160 representing the $dV_z$ signal at temperature of −25°C, +25°C and +100°C respectively in FIG. 7 the write current duration has been reduced from 140 nsec. at the 10% points which include 10 nsec. rise and fall times in FIG. 6 to 100 nsec. in FIG. 7. At the 90% points the duration has been reduced from $t_d$ = 100 nsec. in FIG. 6 to $t_d$ = 80 nsec. in FIG. 7. Similarly, the rise time of the read current has been reduced from 30 nsec. to 20 nsec. and the magnitude of the read current has been increased very slightly from 630ma to 640ma.

It can be observed that the switching characteristics are extremely stable at or below room temperature. At +100°C a small change in the $uV_1$ switching curve is beginning to appear. Under the drive conditions of FIG. 6 the trailing edge of the switching curve exhibits a time spread of only 3 nsec. at the 30mv level. Under the accelerated conditions of FIG. 7 where the +100°C curve 152 has become slightly less stable the trailing edge of the switching curve exhibits a time spread of 7 nsec. at the 300mv level. This increased spread at the trailing edge is due largely to the increased rise time of the read pulse and also due partly to an increased dependence on core characteristics and current drive conditions as the amount of switched flux becomes very small.

For the curves of FIG. 6 the characteristics of the read current are $Ir$ = 640ma, $t_r$ = 200 nsec., $t_f$ = 10 nsec. and $t_d$ = 60 nsec.; the characteristics of the total write current are $Iw$ = 500ma, $t_r$ = 10 nsec., $t_f$ = 10 nsec. and $t_d$ = 80 nsec.; the characteristics for the word line write current are $Ipw1$ = 300ma, $t_r$ = 10 nsec., $t_f$ = 10 nsec. and $t_d$ = 80 nsec.; and the characteristics for the digit line current are $Ipw2$ = 200ma, $t_r$ = 10 nsec., $t_f$ = 10 nsec. and $t_d$ = 80 nsec. The resulting switching curves have a characteristic at −25°C of $uV_1$ = 86mv, $dV_z$ = 14mv, $t_p$ = 32 nsec., $t_s$ = 58 nsec.; at +25°C of $uV_1$ = 74mv, $dV_2$ = 11mv, $t_p$ = 32 nsec., $t_s$ = 59 nsec.; and at +100°C of $uV_1$ = 98mv, $dV_z$ = 12mv, $t_p$ = 37 nsec. and $t_s$ = 60 nsec.

Figure 9:
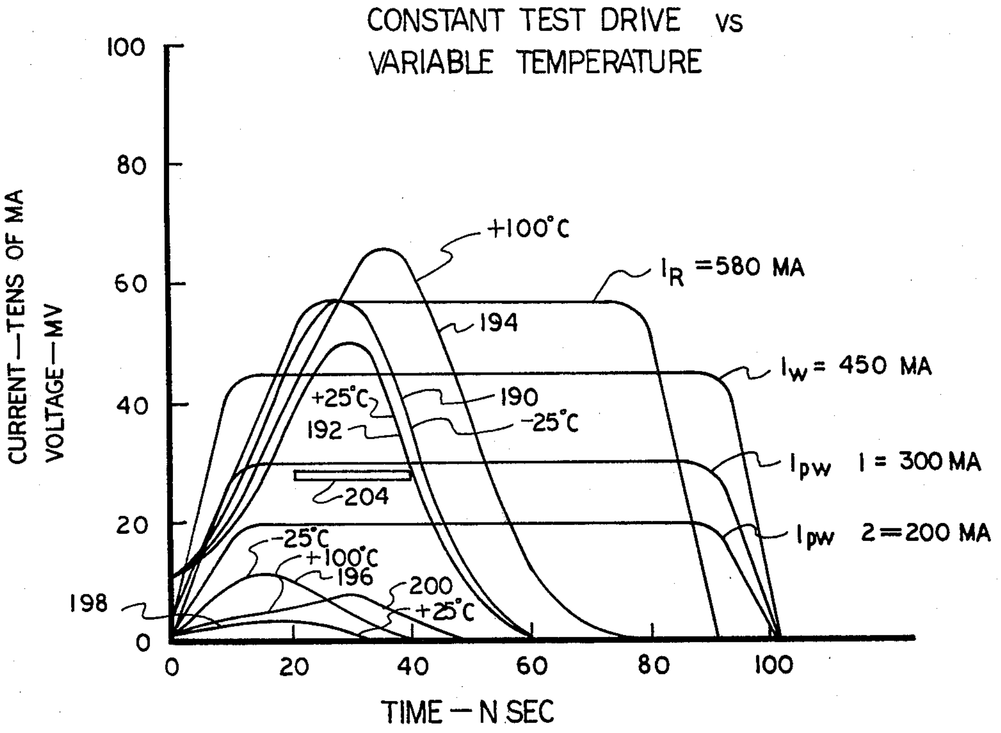
FIG. 9 is a graphical representation of switching characteristics for a temperature independent core used in memories in accordance with the invention at various temperatures under conditions of test drive of 80 nsec. duration.

The TIN 1836 core is extremely stable with respect to minor changes in current magnitude as well as changes in temperature. FIGS. 8 and 9 illustrate the switching characteristics of a core under the same timing conditions as used in FIGS. 6 and 7 respectively, but under test current amplitude conditions. For testing, the drive current magnitudes are degraded by decreasing the total read and write currents by 10% while maintaining the partial write currents at their full magnitudes of $Ipw1$ = 300ma and $Ipw2$ = 200ma. FIG. 8 illustrates core switching characteristics with $I_R$ reduced from 630ma to 570ma and $Iw$ reduced from 50 ma to 450ma but with other drive signal characteristics remaining the same as described in connection with FIG. 6. FIG. 9 illustrates core switching characteristics with $I_R$ reduced from 640ma to 580ma and $Iw$ reduced from 500ma to 450ma but with other drive signal characteristics remaining the same as described in connection with FIG. 7.

As shown in FIG. 8, $uV_1$ switching curves 170, 172, and 174 and $dV_2$ switching curves 176, 178 and 180 illustrate the TIN 1836 core switching characteristics at −25°C, +25°C and +100°C respectively. Similarly, as shown in FIG. 9, $uV_1$ switching curves 190, 192, and 194 and $dV_2$ switching curves 196, 198, and 200 illustrate the TIN 1836 core switching characteristics at −25°C, +25°C and +100°C respectively.

By comparing the curves of FIGS. 8 and 9 with the curves of FIGS. 6 and 7 it can be seen that degradation of the read and write currents has very little effect on the $dV_z$ curves, decreases the peak magnitudes of the $uV_1$ curves, and slightly increases the spread in the trailing edge of the $uV_1$ switching curves from 66–69 nsec. to 63–73 nsec. The total time spread in the trailing edge at 30ma is thus only 10 nsec. and this spread improves considerably at temperatures below 100°C. At or below room temperature the total spread is only 5 nsec. from 63–68 nsec. The time relationship of the trailing edge is thus extremely stable over a wide range of temperatures and currents. Furthermore, a 30 nsec. sensing window at the 30 mv level exists from 30 nsec.

to 60 nsec. in the $uV_1$ curves of both FIG. 6 and FIG. 8 as indicated by rectangle 202.

At even faster switching times as indicated by FIGS. 7 and 9, the stability of the trailing edges of the switching curves deteriorates somewhat but still remains quite good. At the 30mv level the time position of the trailing edges ranges from 48–55 nsec. in FIG. 7 to 40–53 nsec. in FIG. 9. The total range is thus only 40–55 nsec. or 15 nsec. This range can be improved somewhat by decreasing the slope during the 10 to 90% rise time of the read current. The slope of the read current has a substantial effect upon the characteristics of the switching curves when small amounts of flux are switched as in FIGS. 7 and 9. A 20 nsec. strobe window exists at the 30mv level from 20–40 nsec. over the complete range of temperature and current variations illustrated in FIGS. 7 and 9 even under the extremely fast switching conditions illustrated therein.

Figure 10:
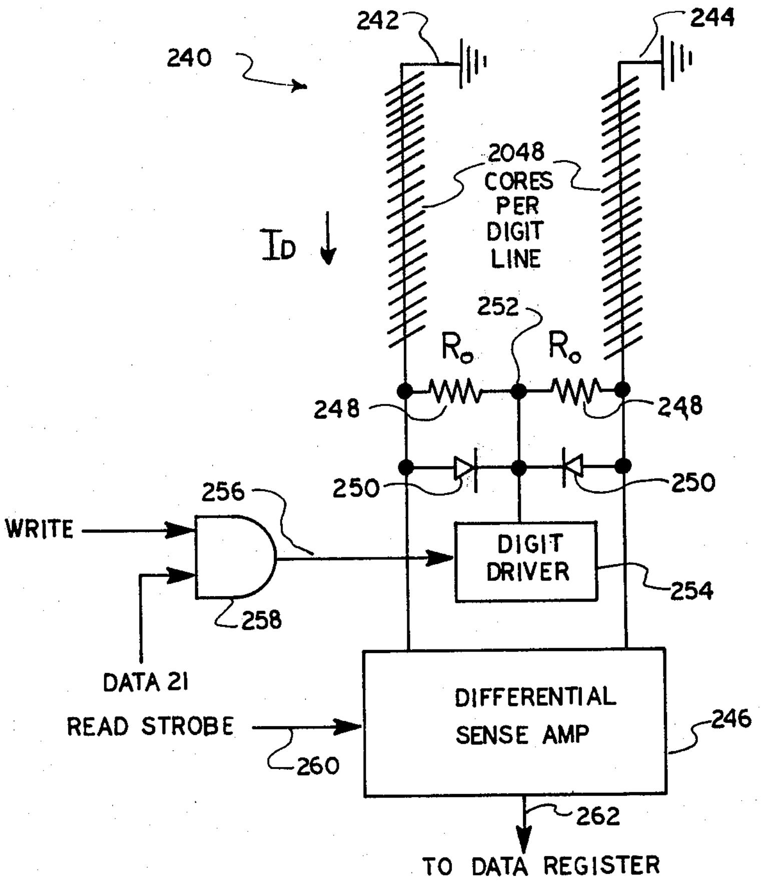
FIG. 10 is a part schematic diagram and part block diagram representation of a bit line circuit in accordance with the invention.

The sensing and driver circuitry for each of the 512 digit positions of memory 10 in FIG. 1, which are substantially identical, are illustrated by octal position 21 as illustrated in FIG. 10 by digit circuit 240. Digit circuit 240 includes a first digit line 242 threading 2048 cores in lower circuit board 12 and a second digit line 244 threading 2048 cores in upper circuit board 14. The lines 242, 244 are connected to ground at a terminal end and connected to a differential sense amplifier 246 at an opposite control end. At the control end each digit line 242, 244 is also connected through the parallel combination of a resistor 248 having a value $R_0$ equal to the characteristic impedance of digit lines 242, 244 and a diode 250 to a common terminal 252. The diodes 250 have their anodes connected to the digit lines 242, 244 and their cathodes connected to the common terminal 252. The resistors 248 improve the settling time on the digit lines 242, 244 after a write operation by rapidly dissipating stored capacitive and inductive energy in the lines and minimizing reflections. Although not utilized in the present arrangement, further improvement in the settling time is attainable by connecting a resistance equal to the digit line characteristic impedance between the terminal ends of the digit lines 242, 244 and ground. These resistances have the adverse effects of increasing power dissipation and decreasing the magnitude of the output switching pulse signals. The diodes 250 serve as a bypass for resistors 248, eliminating the need to pass drive current therethrough, during a write operation.

Drive current is supplied by a digit driver 254 which may be conventional in nature. Driver 254 responds to a digit drive command signal on input 256 by driving the common terminal with a current of $2I_D = -400$ma. This current is divided between the digit lines 242, 244 so that each is driven with a desired partial select digit current $I_D = -200$ma. Upon receipt of the digit drive command the digit driver ramps approximately linearly to the −400ma current level with a 10 to 90% rise time of approximately 10 nsec. Upon termination of the digit drive command, digit driver 254 ramps approximately linearly back to the zero current level with a 90 to 10% fall time of approximately 10 nsec. An AND gate 258 receives the octal bit 21 from the data register 22 signal and write command signal as inputs and generates the digit drive command signal on conductor 256 in response to the coincidence of these two signals. In this way the duration of the digit drive command is controlled by the write command and is enabled by a one in the associated data register, indicating that a one is to be written into memory. The duration of the write command is preferably about 80 nsec.

Differential sense amplifier 246 may be a conventional sense amplifier responsive to difference mode signals in excess of 10mv. The sense amplifier responds to a read strobe signal on input conductor 260 by generating a one output signal on the output conductor 262 when the differential input exceeds 10mv. The read strobe is preferably initiated approximately 20 nsec. after the 10% rise point of the read signal is reached and preferably has a duration of about 20 nsec.

Figure 11:
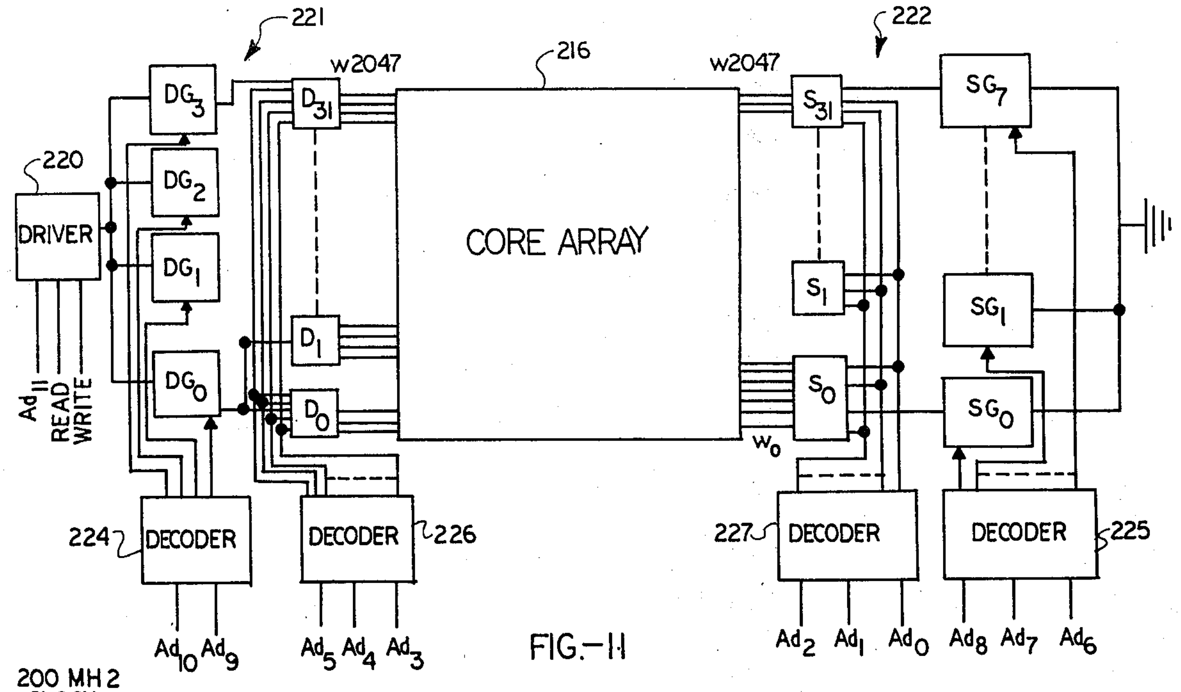
FIG. 11 is a block diagram representation of a word line decoding scheme in accordance with the invention.

The conventional word line driver and decoder configuration is shown in FIG. 11 for the upper core array 216 and includes associated word driver 220, and diode decoder circuitry 221 and sink decoder circuitry 222. The word line driver and decoder configuration on the lower circuit board 12 is substantially identical except that the lower array responds to a logic zero in the most significant address bit, $Ad_{11}$, while the upper array is activated by a logic one in the most significant address bit.

At the driver end the 2048 word lines of array 216 are arranged into 32 driver groups $D_0$–$D_{31}$ of 64 word lines each. Each driver group is driven by one of four bidirectional driver gates $DG_0$–$DG_3$ which are in turn driven by driver 220. Address lines $Ad_{10}$ and $Ad_9$ are decoded by a decoder 224 to select one of the four gates which drives 8 driver groups. Address lines $Ad_8$, $Ad_7$ and $Ad_6$ are decoded by a decoder 225 to select one of the 8 driver groups selected by decoder 224. Each of the driver groups $D_0$–$D_{31}$ contains 8 sets of 8 word lines connected in common and one of the 8 sets is enabled in response to decoder 226 which is controlled by address lines $Ad_5$, $Ad_4$ and $Ad_3$. Each sink group $S_0$–$S_{31}$ connects one wire from each set of driver word lines to one of 8 sink switches through isolating diodes and one sink switch is closed by a signal from decoder 227 operating in response to address lines $Ad_2$, $Ad_1$ and $Ad_0$.

The control system 28 (FIG. 1) may be conventional in nature and controls timing and sequencing of the memory as well as the interfacing with an associated data processor. Because of the many variations in the interface requirements of different data processors, control 28 will vary from application to application. From the standpoint of memory operation, the control 28 need only control the input and output of data and address information and the activation and timing of the read, write and read strobe command signals.

When the memory 10 is operated in a bistable mode a read command generated by control 28 preferably has a duration of about 80 nsec. and causes the word line driver to generate a read current of about 640ma with a 10–90% rise time of about 20 nsec. Upon termination of the read command the read current decreases to zero with a 90–10% fall time of about 10 nsec. The write command preferably has a duration of about 90 nsec. and causes the generation of a 300ma word line current and a 200 nsec. digit line current, both having a 10–90% rise time of about 10 nsec. and a 90–10% fall time of about 10 nsec. beginning with the termination of the write command. The sense amplifier preferably senses a differential voltage of about 30mv and is strobed during the interval 20–40 nsec. after initiation of a read command.

When operated in a multistate mode, the control and word drive circuit configurations remain substantially the same as for a bistate mode of operation while the digit drive and sense circuitry requires additional circuitry. In a multistate mode of operation the control 28 controls read and write operations with 400 nsec. duration read and write commands. The word driver responds to a write command by initiating a 200ma write current which is gated through an addressed word line as explained above. The word line write current has a 10–90% rise time of approximately 10 nsec. and continues unitl termination of the write command at which time the word line write current is decreased to zero with a 90–10% fall time of approximately 10 nsec. The word line thus has a 90–90% duration of approximately 390 nsec. While the duration of the word line drive current is not critical it must be at least as long as the duration of the longest digit write current. In contrast to the bistable memory arrangement where the word line current drives against a hard full flux knee of a partially selected core and where the one time only switching of a small amount of flux is not critical, the work line partial write current must be limited to a value below the permanent flux switching knee in the multistate mode because the duration is greater, the switching of even small amounts of excess flux to the one state may have a substantially effect on the critical timing relationships during readout.

The full read current is induced on the addressed word line in response to a read command from control circuits 28. The read current has a magnitude of 400ma and a 10–90% rise time of approximately 40 nsec. Upon termination of the read command, the read current returns to zero with a 90–10% fall time of approximately 40 nsec. The 90–90% duration of the read current is thus approximately 360 nsec. and is not critical except that it must be long enough to insure that each core is switched to a full flux zero state as a uniform reference point. Reduction of the read current magnitude to 400ma reduces the peak magnitudes of the output switching signal to the range of 14–27mv, but eases the tolerances on sensing time relationships by increasing the peak tires and swithcing times of the output switching signals. For good repeatability in sensing the trailing edge of the output voltage switching pulse, the sensing threshold is at a relatively low level below 20mv and preferably at or below approximately one-third the peak magnitude. The variation tolerance on the threshold should be less than 2mv. In the present arrangement the trailing edge of the output switching pulse is sensed at a threshold of 11mv.

Figure 12:
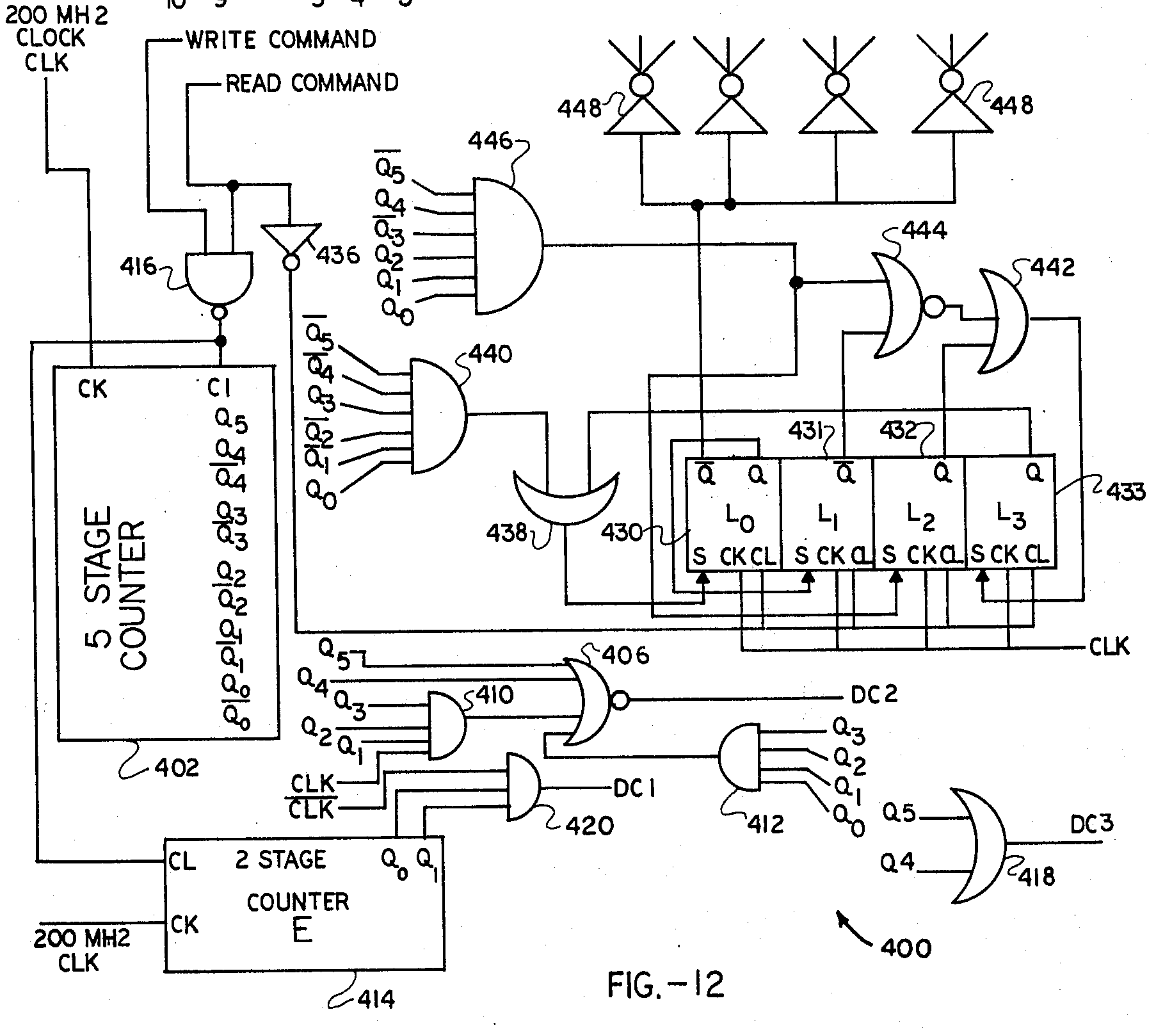
FIG. 12 is a schematic diagram representation of a circuit providing timing control for a memory in accordance with the invention.
Figure 13:
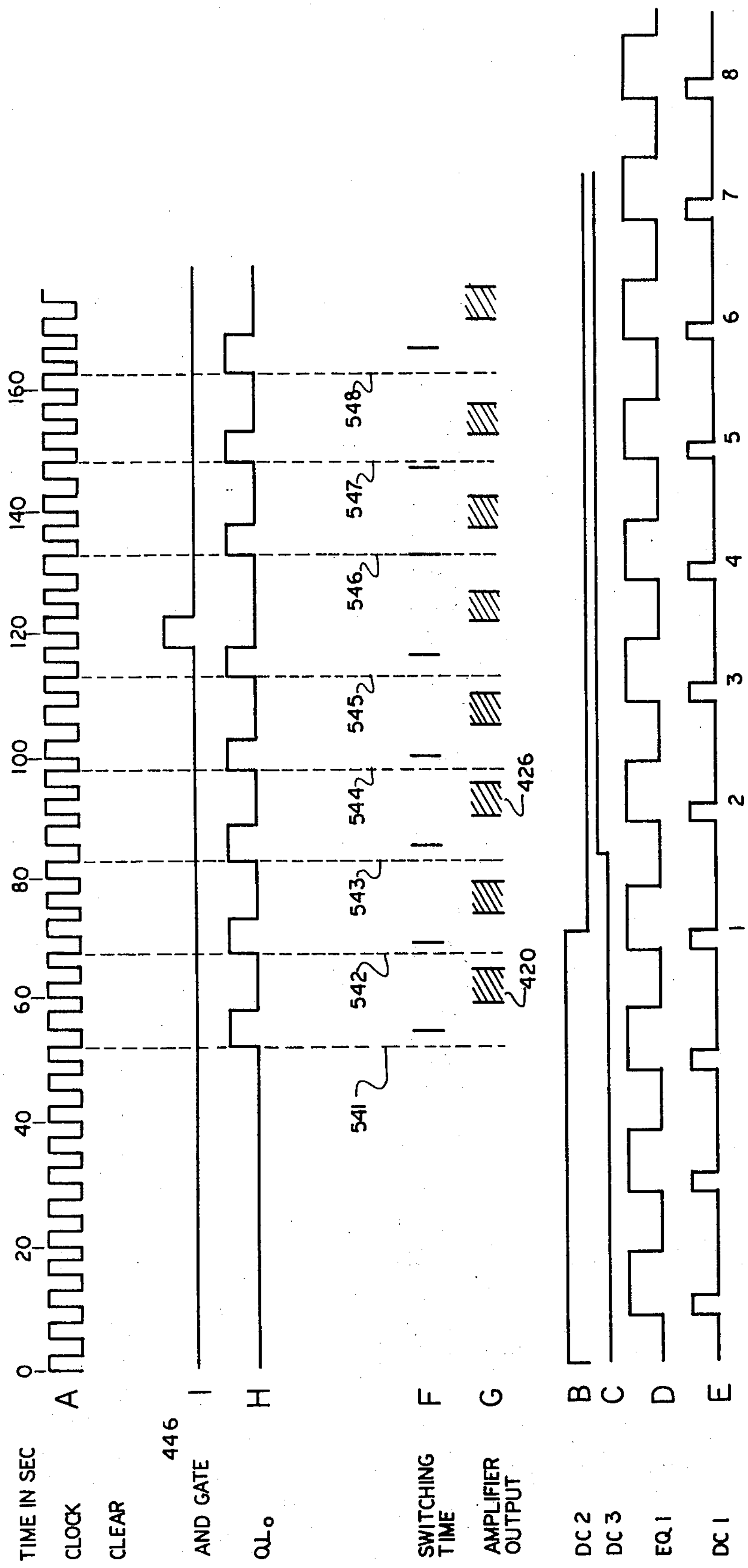
FIG. 13 is a diagram illustrating the timing relationship of signals occurring within a memory in accordance with the invention.
Figure 14:
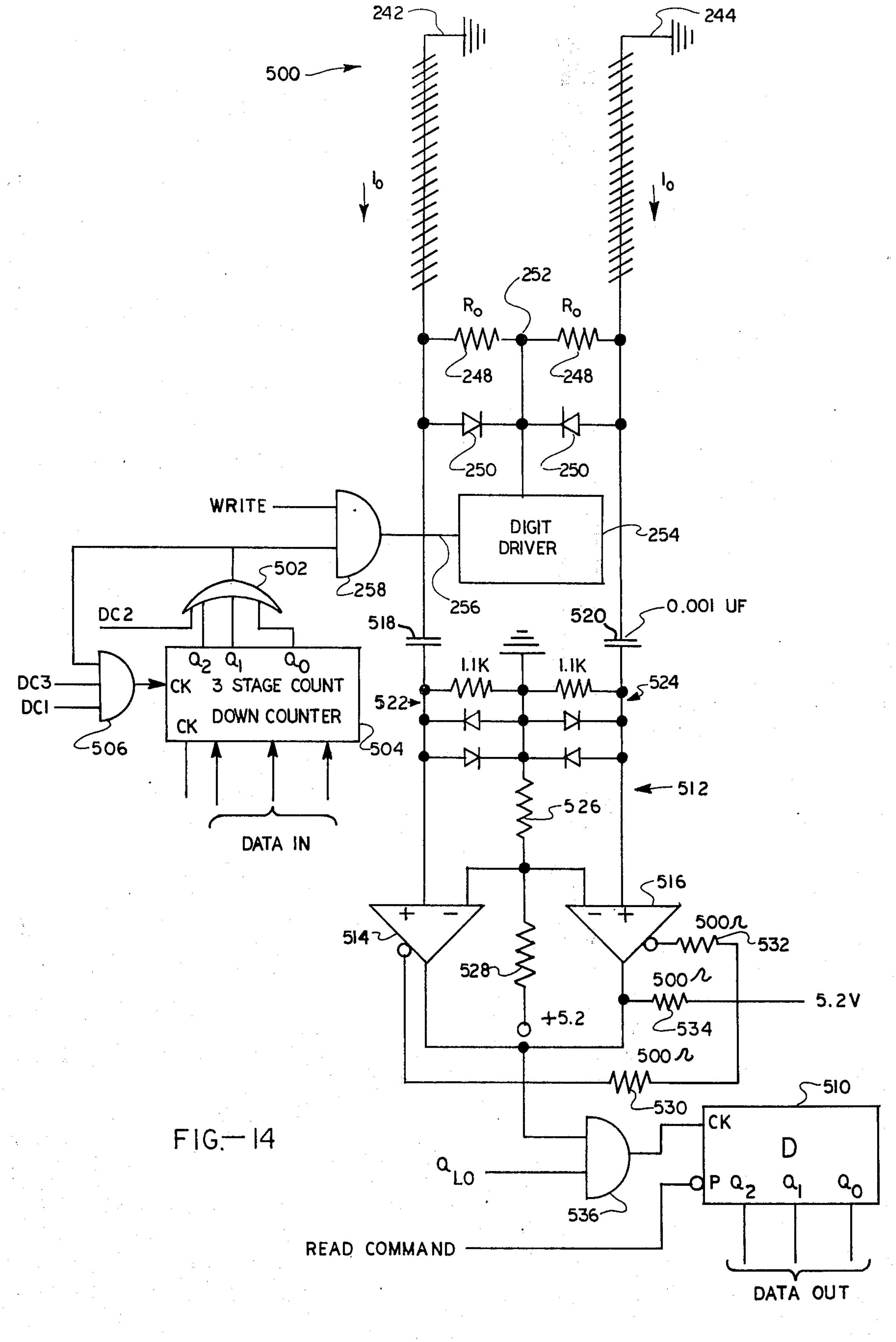
FIG. 14 is a schematic diagram representation of a bit line circuit for a multi-state memory in accordance with the invention.

The digit circuitry for digit line octal 21 is illustrated in FIGS. 12, 13 and 14. The common control circuitry 400 for a plurality of digit circuits is shown in FIG. 12 wherein a 5 stage counter 402 is shown as providing the basic digit timing for read and write operations. The counter 402 and all other logic components used herein may be fabricated from high speed emitter coupled logic circuits commercially available in the form coupled integrated circuits. The flip-flops of the counters and registers are master-slave flip-flops wherein the input is changed and the output locked during the logic 1 portion of a clock cycle and the input is disabled while the output changes to reflect the immediately prior input during the logic 0 portion of a clock cycle. The clock signal, CLK, is a 200 MHz symmetrical squarewave clock signal providing a half period digital time resolution of 2.5 nsec. to the digit control circuitry. The clock pulse waveform is illustrated in curve A of FIG. 13.

During a write operation, the digit currents are active for a base 90–90% time duration of 40 nsec. plus 200 nsec. for each sequentially higher state which is to be written into a core. The digit driver must be activated for these selected time periods plus 10 nsec. for the rise time. The 10 nsec. fall time occurs after deactivation of the driver. Thus, the activation time for state 1 (binary 000) is 70 nsec., for state 2 (binary 001) 90 nsec., for state 3 (binary 010) 110 nsec. and so forth up to 210 nsec. for state 8 (binary 111). Since the conditions of "switching no flux" is not used as a state in this application the minimum write duration is for state 1 (binary 000) and is equal to 70 nsec.

A NOR gate 406 provides a signal $\overline{DC2}$ which goes "true" after 70 nsec. as illustrated by curve B of FIG. 13. Signal $\overline{DC2}$ provides the timing for writing state 1 (binary 000). An AND gate 410 responds to the $Q_3$, $Q_2$ and $Q_1$ outputs of control counter 402 and the clock, CLK, by activating NOR gate 406 to the "false" state during a 70–72.5 nsec. time slot. An AND gate 412 is responsive to the $Q_3$, $Q_2$, $Q_1$ and $Q_0$ outputs of counter 402 to hold NOR gate 406 in the false state during the 72.5–77.5 nsec. time interval and $Q_4$ and $Q_5$ outputs from counter 402 are connected as inputs to NOR gate 406 to hold it in the place during the 72.5–77.5 nsec. time interval and $Q_5$ and $Q_4$ outputs from counter 402 are connected as inputs to NOR gate 406 to hold it in the false state during subsequent time intervals. Both counter 402 and a 2 stage E counter 414 are driven to a cleared state by a NAND gate 416 in the absence of a read command or a write command from control circuits 28 (FIG. 1). Time zero for either a read or write cycle thus occurs when the initiation of a read or write command respectively.

An OR gate 418 responds to the $Q_5$ and $Q_4$ outputs of counter 402 to generate a signal DC3 which goes true at 82.5 nsec. and remains true for the remainder of a write cycle as shown in curve C of FIG. 13. DC3 disables clock signal DC1 until after the 1 state (binary 000) has been written.

The clock signal DC1, is generated by an AND gate 420 which is responsive to the $Q_1$ and $\overline{Q}_0$ outputs of two stage E counters 414. The $Q_1$ output of counter 414 is shown in curve D of FIG. 13 to provide a time reference. The $\overline{Q}_0$ signal limits the AND gate 420 output to the first half of the true portion of signal $Q_1$ and the system inverted clock CLK further limits AND gate 420 output signal DC1 to the first quarter as illustrated by curve E of FIG. 14. The true going transitions of signal DC1 define the desired clocking times of a timing counter for the digit write current.

The common read control logic provides the required precise timing for detecting the state of a core during readout. Curve 7 shows the times at which the output switching curve voltage outputs drop below the 11mv threshold level for the different stored states. These times occur at cores near the word driver and digit sense circuits where the travel time through the memory array is negligible.

Curve G of FIG. 13 represents these threshold times after allowance is made for a 5 nsec. delay through the sense amplifiers. The hatched portions 426 represent the possible 11mv switching times as the pulse travel time through the memory array varies from 0–5 nsec., including a 5 nsec. delay through the sense amplifier. It is thus desirable to sample the output of the sense amplifier approximately midway between the hatched times 426 for best reliability.

This precise timing is provided by a four stage circulating logic shift register $L_0$–$L_3$ 430–433. The clear inputs to $L_0$–$L_3$ are connected through an inverter 436 to the read command signal which thus clears the L shift register 430–433 in the absence of a read command signal and enables it in response to the presence of a read command signal. With the sensing timing signals and the word line read current both being time related to the read command, they are thus indirectly time related to each other. An OR gate 438 which drives the set input to stage $L_0$ 430 receives inputs from the true output (Q) of the fourth stage $L_3$ 433 and an AND gate 440 which is connected to produce a true output in response to a count of decimal 9 by counter 402.

The set input of logic shift register stage $L_3$ 433 is connected to the output of an OR gate having two inputs connected to the true output of stage $L_2$ 432 and the output of a NOR gate 444 respectively. Nor gate 444 has two connected respectively to the false outputs of stage $L_1$ 431 and the output of an AND gate 446. AND gate 446 is connected to go true when counter 402 outputs a count of 23 and also has its output connected to the set input of stage $L_2$ 432.

In operation, logic control register L is enabled by a true read control signal but remains in the all false state until AND gate 440 goes true at count 9. Stage $L_0$ 430 responds by going true during count 10 (time 52.5–57.5 nsec.) as indicated by curve H of FIG. 13. Logic control register L then commences to circulate through stages $L_0$, $L_1$ and $L_3$ under control of the 200 MHz system clock signal CLK with stage $L_0$ going true for 5 nsec. every 15 nsec. and stage $L_2$ being bypassed by control count 23 of counter 402. At count 43 (117.5–122.5 nsec.), as indicated by curve I of FIG. 14, AND gate 446 goes true, disabling the setting of stage $L_3$ and enabling the setting of stage $L_2$, whose output goes true during count 24 and drives the output of stage $L_0$ then sequentially goes true during count 26 (132.5–137.5 nsec.) as indicated by curve H of FIG. 14. Stage $L_0$ thus goes true every 15 nsec. except between counts 5 and 6 during which an additional 5 nsec. delay is utilized to more nearly match sampling times which are controlled by the true state of stage $L_0$ with switching times for the memory states of the cores. The false output of stage $L_0$ is fanned out through inverting amplifiers 448 to generate a plurality of sample control signals $QL_0$ for the digit circuitry. Though not shown for simplicity, it will be recognized by those skilled in the art that additional fanout may be achieved by amplifying the true output of stage $L_0$ 430 without inversion.

The digit line circuitry 500 for digit line octal 21 is shown in FIG. 14. The portion of the circuitry within the magnetic array 16 (FIG. 1) is the same as for the same line octal 21 of the two state arrangement shown in FIG. 10 to a large extent and identical reference numerals are used to identify identical components. However, additional high speed control and sense components are required to meet the increased timing precision required in the multistate memory.

During a write operation digit driver 254 is controlled by the output of AND gate 258 which is enabled by the write command and controlled by the output of an OR gate 502. OR gate 502 has four inputs connected respectively to the three true outputs of a three stage presentable countdown counter 504 and control signal $\overline{DC2}$. Counter 504 has its decrementing clock input connected to the output of AND gate 506 which receives signals DC1, DC3 and the output of OR gate 502 is inputs. The output of OR gate 502 prevents the counter 504 from recycling after it has decremented to zero.

In operation, counter 504 is preset to a desired information state with binary 000 representing state 1, binary 001 representing 2 and so forth to binary 111 representing state 8. These preset controls are schematically represented by the preset clock and three data termminals labeled "data in" which may be connected to appropriate outputs of date register 22. The actual configuration may vary slightly with the exact configuration of the counter with the same clock input being used for both decrement and preset true and false inputs being required for each stage in some configurations.

After counter 504 is preset to a given state, a write command is initiated. Signal $\overline{DC2}$ immediately goes true and propagates through an OR gate 502 and AND gate 258 to activate digit driver 254 which immediately begins driving two 200ma digit currents $I_D$ with a rise time of 10 nsec. As indicated by curves B, C and E of FIG. 13, signal $\overline{DC2}$ causes activation of driver 254 and 70 nsec., which is the time for writing state 1 (binary 000). If counter 504 stores state 1, there is no output from OR gate 502 to activate driver 254 and the digit drive currents decrease to zero with a fall time of 10 nsec. However, if counter 504 is in state two or higher, one of its outputs $Q_0$, $Q_1$ or $Q_2$ will be true and operation of digit driver 254 will continue. After 82.5 nsec signal DC3 goes true, enabling AND gate 506 so that counter 504 receives a decrementing clock signal between 87.5 and 90 nsec which is periodically repeated every 20 nsec thereafter. If counter 504 has been preset to state 2 (binary 001), it will be decremented to zero by the first clock signal after DC2 goes false and this zero state will be reflected in the output of counter 504 as the clock signal goes false at the 90 nsec time point, immediately deactivating the digit driver 254. If the counter 504 is preset to successively higher states, successive additional 200 second intervals are required before the counter 504 is decremented to zero.

It is thus seen that the total activation time of driver 254 is equal to 40 nsec + $tr$ + S (20 nsec), where 40 nsec is a period during which a minimum amount of threshold flux is written into a core before any state is written, $tr$ is the rise time of the digit current (10 nsec in this arrangement) and S is the state which is to be written. The amount of permanently switched flux thus increases with the desired memory state.

A selectively addressed core thus receives a total write switching current with a time integral having one of eight discrete values. The time integral of the 400 ma total write current is equal to $400(½)(t_r) + 400(½)(t_f) + 400(40)+400(20)(S)$. Since the digit currents determine the times during which the total drive current exceeds the coercive force of the cores, the rise and fall times of the digit currents are used in computing the integral. These times are both fixed at 40 nsec and the time integral becomes equal to 32000 + 8000(S). The amount of flux which is switched is approximately equal to the time integral of the total switching current less the time integral of the coercive force current of about 230 ma. The rise and fall times to the 230 ma level are approximately 23 nsec. The coercive force current time integral is thus 230(½)23 + 230(½)23 + 230(40) + 230(20)(S) or approximately 14,500 + 4300S. Subtracting the coercive force current time integral from the total current time integral it is seen that the total switched flux is generally proportional to 17,500 + 3700S. In a memory configuration where one state is indicated by switching no flux as is done with conventional bistable memories, the total current does not exceed the coercive force of a core and the above relationships would not be applicable to the no flux state.

During a read operation substantially all of the permanent flux of a read core will be switched to the zero state if the time integral of the excess of the magnitude of the read current over the magnitude of a current required to induce a coercive force is greater the time integral of the excess of the magnitude of a write current over the coercive force inducing current during a most recently preceding storing operation for the core. This relationship is assured by making the time integral of the excess read current greater than the time integral of largest time integral of the excess write current which is used.

The read portion of the digit circuitry 500 includes a D register 510 which stores and counts data states during the reading of a core and an extremely fast, highly sensitive sense amplifier 512. The sense amplifier 512 is constructed from two high speed voltage comparators 514, 516 such as Am 685 voltage comparators which are commercially available from Advanced Micro Devices, Inc.

The voltage comparators 514, 516 have their positive input terminals connected through 0.001 uf blocking capacitors 518, 520 to the lower and upper digit conductors 242, 244 respectively. Each positive input is also connected through a clamping network 522, 524, respectively including a pair of anti-parallel diodes and a 1.1 Kohm resistor to ground. The blocking capacitors 518, 520 and associated clamping networks 522, 524 shield the positive input terminals of comparators 514, 516 from high voltage damage during the write operation by limiting the voltage thereat to approximately ± 0.7 volt. The resistors improve recovery time following a write operation by dissipating the stored energy of the capacitors 518, 520 and clamping the digit lines to ground in the absence of a signal thereon.

The negative input terminals of comparators 514, 516 are maintained at the constant 11 mv threshold level by connection to a central node of a resistive voltage divider network having a 110 ohm resistor 526 connected between the node and ground and a 43.2 K resistor 528 connected between the node and a +5.2 volt source. The inverted outputs of comparators 514, 516 are connected through 500 ohm resistors 530, 532 respectively to a −5.2 volt source while the noninverting outputs are connected together and through a 500 ohm resistor 534 to the −5.2 volt source. The noninverting outputs are also connected to one input of an AND gate 536 whose output drives the clock input for counter 510. AND gate 536 receives the signal Q $L_0$ (curve H of FIG. 13) as its other input and thus increments counter 510 with precisely timed clock pulses which are synchronized with the output switching signal so long as the output of either comparator 514 or 516 remains true during a read operation. An inverting preset input constrains data counter 510 to all true outputs in the absence of a read command.

Counter 510 is thus in the binary 111 state when the first clock pulse is received. Upon receipt of the first clock pulse, counter 510 overflows to state 1 (binary 000) and is incremented by each successive clock pulse so long as a noninverting output of a comparator 514 or 516 remains in the true state, meaning that the output switching pulse has a magnitude in excess of the threshold of 11 mv since the output switching pulses are monotonically decreasing functions. The sampling of the comparator 514, 516 outputs effectively occurs at the leading edges of the $QL_0$ clocking pulses as indicated by dashed vertical lines 541, 542 . . . 548, which indicate the sample times for states 1, 2 . . . 8 respectively. If a read core stores state 1, which is the minimum state in this arrangement, the counter 510 is clocked to binary 000 at time 541 and then the output switching voltage drops below the 11 mv level during the time interval indicated by first hatched area 426 in curve G of FIG. 13, thereby inhibiting further incrementing of counter 510. Were the no switched flux state to be used as one of the possible states in place of the state used as the eighth state in this arrangement, the counter 510 would be preset to 111 and would not be clocked at time 541 for a core storing a first state. When the data output of counter 510 is transferred to the data register prior to termination of the read command but subsequent to time 548, state 1 (binary 000) will be indicated. If higher states are stored by a read core, the incrementing of counter 510 will be enabled until the stored state is indicated. The time intervals between dashed lines 541–548 and hatched areas 426 represent permissible tolerances on the threshold switching time of a core for which no erroneous output will be indicated.

Figure 15:
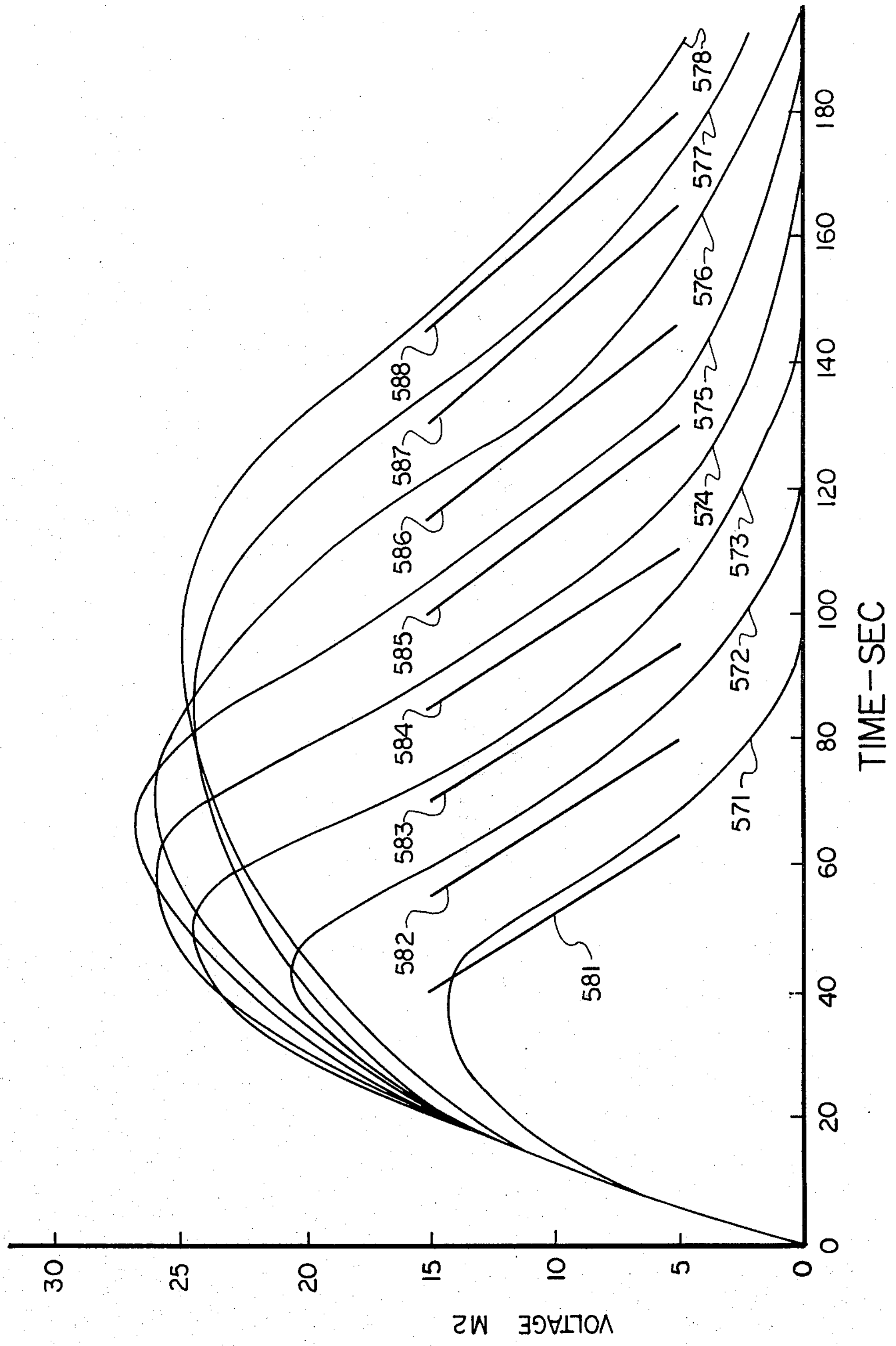
FIG. 15 is a graphical representation of output switching signals for various states of a multi-state memory in accordance with the invention.

In alternative arrangements, the clock signal $QL_0$ may be utilized as a strobe signal for a strobe type sense amplifier and may be ANDed with an inverted system clock signal CLK to limit the strobe duration to the first 2.5 nsec. of the 5 nsec. pulses of signal $QL_0$. Sense amplifier requirements may be decreased or sampling precision may be increased by using a ramping threshold during the sampling interval. This effect is illustrated in FIG. 15, which shows output switching pulse curves 571–578 for states 1–8 respectively. By using a ramping threshold level as indicated by lines 581–588 for states 1–8 respectively, the sampling interval can be increased from 1 or 2 nsec. to 25 nsec. The ramps are illustrated as beginning at 40 nsec. and recurring every 15 nsec. but it will be appreciated that an additional delay of several nsec is required to compensate for signal delay through the sense amplifier. This additional delay is omitted for clarity. All threshold ramps are initiated at the 15 mv level with the ramps 581–584 for the first four states declining at the rate of 0.4 mv per nsec. However, the slope at the trailing edge of the output switching curve becomes less steep for higher order states and the decline rate is reduced to 0.33 mv per nsec for states 5 and 6 and to 0.286 mv per nsec for states 7 and 8.

It is noted that the ramps overlap, making it necessary to utilize two separate sense amplifiers simultaneously with one strobed for the odd numbered states and the other strobed to sample the even numbered states. A separate counter may be associated with each sense amplifier and incremented in response to a true output from the associated sense amplifier during a strobe interval. The read memory state is equal to the sum of the counts stored by the two counters at the end of a read interval. By limiting the ramp threshold excursions to 4 mv, for instance 13–9 mv, a single sense amplifier and counter may be used to sense all output states. Furthermore, with the threshold limited to the range of 13–9 mv, the ramping rate of 0.4 mv per nsec may be used for all 8 ramps. During readout the output switching curves can be further stabilized by driving the word line with a 200 ma partial select read current for 10–20 nsec. prior to increasing the word line current to a full 400 ma at the start of the read interval. The partial select current switches any reversible flux so that only the more predictable permanent flux participates in generating the output switching pulse.

While a single, constant amplitude digit line pulse of 200 ma and controlled duration for each word line is preferred, other arrangements may of course by utilized. For instance, a 40 nsec. initialization current pulse may be followed by separate 20 nsec. current pulses equal in numbers to the state which is to be written. In still another arrangement, the digit current drivers may be controlled by ramping them up to a selected current magnitude such as 200 ma and then immediately ramping them back down with the ramp slope chosen in accordance with the state which is to be written.

The method of operating a large two dimensional array of cores as a multistate core memory wherein each core may retrievably store one of at least three possible states thus includes the steps of storing a selected data state in a selected core and retrieving stored information from a selected core. The storing of information is accomplished by a selected core having substantially all of the permanent flux therein in a first polarity of magnetization with a write current inductively coupled thereto with a polarity tending to switch the magnetic flux of the core to a second state of magnetization opposite the first state. The desired data state can be stored by terminating the write switching current when the time integral of the excess of the magnitude of the write current over the magnitude of a current required to induce a coercive magneto motive force in the core has a value equal to a selected one of at least three predetermined discrete values, the selected one value being dependent upon the information state which is to be stored. Stored information is retrieved from a selected core by driving the selected core with a read current inductively coupled thereto with a polarity tending to switch the flux of the core to the first state of magnetization, sensing the magnitude of the output switching signal generated by the switching of magnetic flux in the selected core as the core is driven with the read current, detecting a one of at least three discrete time intervals during which the magnitude of the sensed output switching signal becomes less than a selected threshold value by counting successive discrete time intervals during which the magnitude of the sensed output switching signal remains above the selected threshold value, and generating an output data signal indicative of the one discrete time period during which the magnitude of the sensed output switching signal becomes less than the selected threshold value. When the memory is operated in this manner a selected discrete amount of flux dependent upon an information state to be stored may be written into the core by a write current having a predetermined magnitude and a duration selected in accordance with the information state to be stored. During a subsequent retrieval the core may be driven with a read current of predetermined magnitude and sufficiently long duration to switch all of the flux in the core to a read state of magnetization as the magnitude of the output switching signal generated by the switching of flux is sensed. The discrete quantity of flux was previously written into the core and which switches during readout is determined by the length of time required for the magnitude of the output switching signal to become less than the threshold value. If no flux is switched, zero time is required for the output switching signal to become less than the threshold value. Since discrete amounts of flux are stored and subsequently switched during readout, the threshold times occur during discrete intervals of time.

Figure 16:
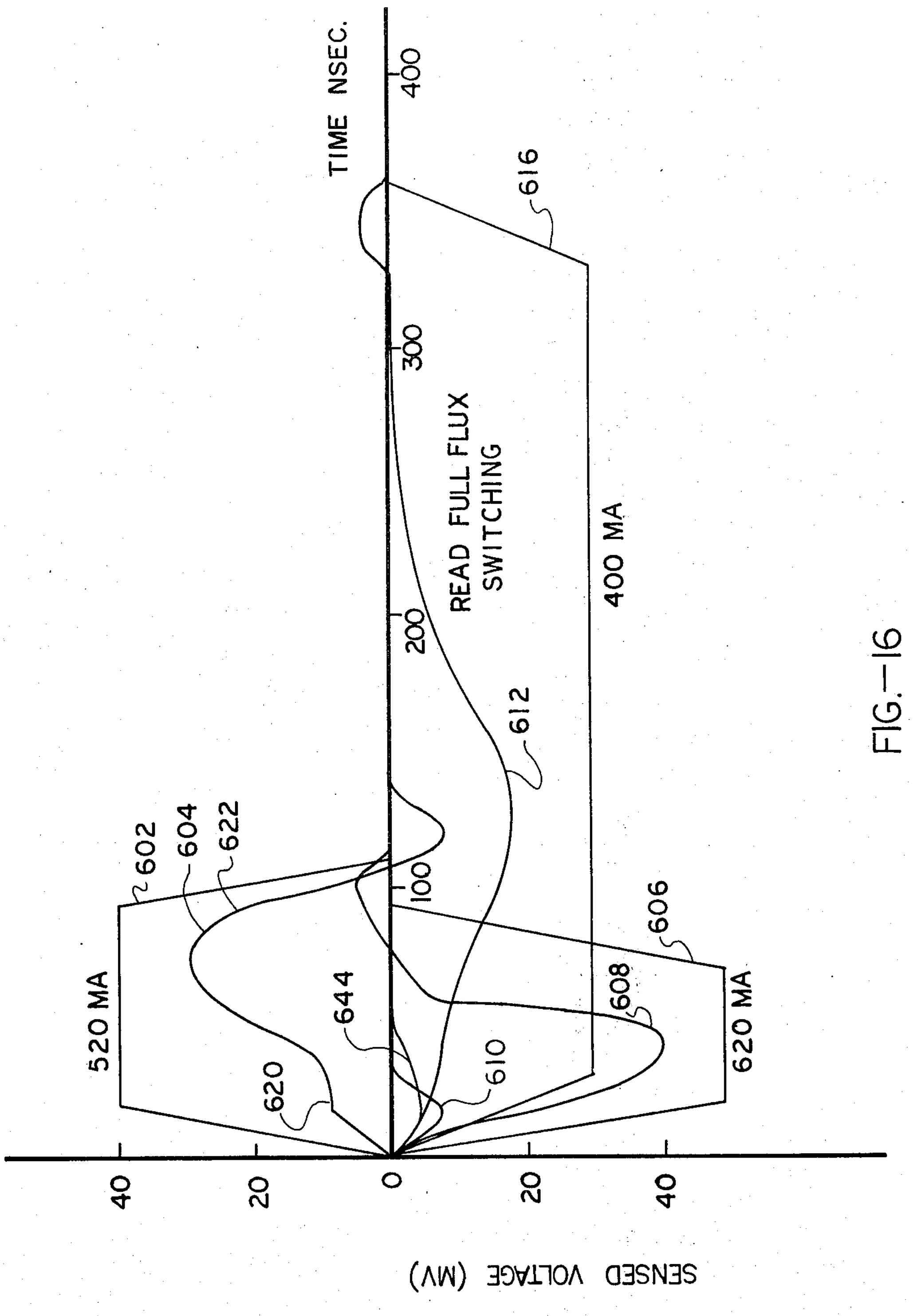
FIG. 16 is a graphical illustration of the shaping of the output switching pulse which results from hard driving of a core with a larger read current than write current in accordance with the invention.

FIG. 16 illustrates the shaping of the output switching pulse which results from hard driving of a core with a larger read current than write current in accordance with the invention. The output switching characteristics relate to a TIN 1340 core manufactured by Ampex Corporation. This is a 13 mil O.D. core requiring a nominal drive current of 400ma for conventional full flux 3D operation. Curve 602 represents the 520ma write one drive current, curve 604 represents the write one switching pulse, curve 606 represents the 620ma read pulse, curve 608 represents the read one switching pulse and curve 610 represents the read zero switching pulse which must be distinguished from the read one pulse. A read one output switching curve 612 and a read zero output switching curve 614 are provided for comparison when the 1340 core is driven by a 400ma full flux switching current waveform 616. It will be noted that even though considerably more flux is switched the peak signal magnitudes are considerably less than for partial flux switching and the peaking and switching time is much greater.

It can be observed that as the flux generated by the rise of the write one current pulse 602 terminates at point 620 a leveling off of the flux curve 604 occurs until the curve 604 begins rising toward the peak at about the 35 nsec. point. At point 622 the shape of switching curve 604 is sharply truncated by the fall of the drive current. The long tail which would otherwise be generated by slower switching flux in the core is thus eliminated and the curve 604 is skewed sharply to the right. The curve is reshaped however to become substantially symmetrical by the larger magnitude 620ma read current represented by curve 606. While the peak of the $dV_z$ curve 610 is somewhat greater for partial flux switching, the magnitude is not further increased by imperfect cancellation of multiple partially disturbed cores and the greater peak magnitude for the $uV_1$ signal permits use of a greater sensing threshold to distinguish over the noise. Furthermore, the much greater stability of peaking and switching times which is attainable with operation as described herein permits much closer tolerances on the placement of the sensing "window" with respect to time.

Memory arrangements and operation as described herein thus lend themselves to the use of small, low coercivity cores for fast, reliable and economical operation. The driving magnetomotive force produced by a current at a given point is inversely proportional to the square of the distance from the current. By using low coercivity ferrite material in smaller cores the magnitude of the required drive current can be reduced considerably without sacrificing speed or reliability. This not only reduces power consumption and dissipation but facilitates the use of integrated circuit and other solid state electronics to further decrease memory cost and increase reliability.

While there have been described above various arrangements of core memories in accordance with the invention, it will be appreciated that the invention is not limited thereto. Accordingly, any variation, modification, or equivalent arrangement within the scope of the appended claims should be considered to be within the scope of the invention.

What is claimed is:

1. A core memory comprising:

at least a first and a second array of similarly oriented and uniformly spaced cores, each array including at least 512 word line conductors, each inductively coupling at least 512 cores and at least 512 digit line conductors each inductively coupling at least 512 cores with each core being coupled by a unique combination of one word line conductor and one digit line conductor, the cores of the first and second arrays having a generally uniform coercive force and generating an output voltage switching signal having a minimum peak magnitude at least 70% as large as a maximum peak magnitude and having a latest peaking time at most 20 nsec later than an earliest peaking time over a temperature range of −25° C. to +50° C.;

a current driver system driving the word line and sense line conductors with currents of proper magnitude, polarity and duration for switching a predetermined amount of flux in any core selected for switching in response to read and write commands, address information and data information; and a sensing system connected to sense an output voltage signal generated on digit line conductors by the switching of a core inductively coupled thereto.

2. The core memory as set forth in claim 1 above, wherein the current driver system generates a first polarity word line current of sufficient magnitude to switch magnetic flux in all cores inductively coupled thereto and no digit line current in response to a read command and a word line current of second polarity opposite the first polarity and a digit line current for each digit line conductor dependent upon the status of associated data information in response to a write command.

3. The core memory as set forth in claim 2 above, wherein the digit line currents have a zero magnitude in response to first data information and second polarity and magnitude in response to second data information and wherein the magnitude of the first polarity word line current exceeds the sum of the magnitudes of the second polarity word line current and second polarity and magnitude digit line current.

4. The core memory as set forth in claim 3 above, wherein the first polarity word line current has a magnitude at least twice the magnitude of current required to induce a coercive force in an inductively coupled core, wherein the second polarity word line current has an amplitude greater than the magnitude of current required to induce a coercive force in an inductively coupled core.

5. The core memory as set forth in claim 2 above, wherein the flux of an inductively coupled core is switched in a major B-H loop wherein the core is driven with switching currents having magnitudes sufficiently greater than the coercive force of a core than an increment in switched flux resulting from an increment of drive current magnitude is small compared to an increment of switched flux resulting from an increment of drive current magnitude when the drive current magnitude is approximately equal to the magnitude of current required to induce a coercive force in the core.

6. The core memory as set forth in claim 2 above, wherein each array contains at least 500,000 cores.

7. The core memory as set forth in claim 2 above, further comprising a data register storing associated data information for each digit line conductor, the stored information representing one of at least three possible states.

8. The core memory as set forth in claim 7 above, wherein nonzero magnitude digit line conductor currents have a predetermined maximum amplitude and waveform and a duration dependent upon the stored state of associated information in the data register.

9. The core memory as set forth in claim 8 above, wherein the sensing system includes electronic circuitry responsive to a read command, said circuitry determining a period of time required for the output voltage signal on each digit line conductor to reach a magnitude less then a predetermined threshold and setting the associated information state of the data register in accordance with the determined period of time.

10. The core memory as set forth in claim 7 above, wherein the beginning of the determined period of time is time related to the word line current.

11. The core memory as set forth in claim 10 above, wherein the sensing system senses the output voltage signal at a threshold level below 0.020 volt with a variation tolerance less than ±0.002 volt.

12. The core memory as set forth in claim 11 above, wherein the sensing system senses the output voltage signal at a threshold level between 0.005 and 0.015 volt.

13. A core memory comprising:

a two dimensional array of similarly oriented toroidal magnetic cores, the array including at least 512 word line conductors each passing through the array in a substantially straight line and inductively coupling at least 512 cores and at least 512 digit line conductors each passing through the array in a substantially straight ling and inductively coupling at least 512 cores with each core in the array being inductively coupled by a unique combination of one word line conductor and one digit line conductor, the toroidal magnetic cores having a predetermined coercive force and being sufficiently stable with respect to temperature that as a core is repeatedly switched under control of a magnetic field having a magnitude approximately equal to 1.2 times the coercive force thereof, and a duration sufficient to permit substantially full flux switching over a temperature range of −25° C to +75° C with other conditions remaining substantially constant, the amplitude of the smallest peak output voltage signal is at least 70% of the amplitude of the largest peak output voltage signal;

means responsive to a write command for driving selected digit line conductors with a current of insufficient magnitude to induce a magnetomotive force in inductively coupled cores which is greater than the coercive force thereof and for driving a selected word line conductor with a polarity of current inducing a magnetomotive force which couples cores also receiving a digit line induced magnetomotive force in an additive relationship thereto, the current on the digit lines and word line being coincident at common cores for a period of time sufficient to switch a selected amount of flux in each coincidently coupled core which is substantially less than all of the flux thereof; and means responsive to a read command for driving a selected word line conductor with a current having a magnitude sufficient to induce a magnetomotive force in cores inductively coupled thereto greater than the coercive force thereof for a period of time sufficient to switch an amount of flux greater than the selected amount of flux switched in a coincidently coupled core in response to a write command.

14. The core memory as set forth in claim 13 above, wherein the word line current generated in response to a read command has a magnitude of at least 1.5 times the magnitude of a current required to drive an inductively coupled core with a magnetomotive force equal to the coercive force thereof.

15. The core memory as set forth in claim 14 above, wherein the cores are composed of a ferrite material having a peak output switching signal versus temperature characteristic with a smallest peak output voltage signal over the temperature range —25° C to 75° C occurring near the middle of the temperature range.

16. A multi-state core memory comprising:

at least one toroid of magnetic material having magnetic flux associated therewith which is switched under the influence of a magneto motive force greater than a coercive force thereof below which substantial amounts of flux do not switch; at least one electrical conductor connected to inductively couple the toroid;

a current control circuit connected to the at least one conductor, the control circuit driving the at least one conductor with first polarity read current in response to a read command which inductively couples the core with a magneto motive force greater than the coercive force required to switch the core from one state to an opposite state of magnetiziation and which has a duration sufficient to switch substantially all of the magnetic flux in the core to a first state, the control circuit driving the at least one conductor with a write current of a second polarity opposite the first polarity in response to a write command and a data signal, the total write current which inductively couples the core having controlled amplitude and time duration characteristics selected to switch a discrete amount of flux dependent upon the data signal from the first state to an opposite second state; and a sensing circuit inductively coupled to sense an electrical switching pulse inducted by the switching of magnetic flux in the core from the second state to the first state having a trailing edge as the pulse decreases in magnitude, said sensing circuit including a threshold sensing circuit and a timing circuit generating a discrete data signal indicative of a time period required for the magnitude of the electrical switching pulse to decrease below a sensed threshold at the trailing edge thereof.

17. The core memory as set forth in claim 16 above, wherein the threshold is generated in the form of a plurality of voltage ramps, each ramp being generated beginning at a different predetermined time with the voltage thereof declining from an initial selected higher voltage to a subsequent lower voltage at a selected rate.

18. A core memory comprising:

a plurality of toroidal magnetic cores having flux associated therewith which is switched in response to a magneto motive force greater than a coercive force of the cores;

a driver system responsive to read commands, write commands, address commands and multistate data commands, each data command commanding one of at least three states, the driver system being inductively coupled to drive selected cores with first and opposite polarity switching currents having sufficient magnitude to induce a magnetomotive force in the selected cores which is greater than the coercive force thereof, the driver system responding to a write command by driving selected cores indicated by an address command with a first polarity switching current having one of at least three predetermined discrete time integrals, the time integral of the switching current being individually determined for each selected core in accordance with an associated multistate command, the driver system responding to a read command by driving selected cores indicated by an address command with an opposite polarity switching current having a time integral greater than the greatest of the at least three predetermined discrete time integrals; and a sensing system connected to sense output switching signals generated by selected cores in response to opposite polarity switching currents and generate a plurality of outputs corresponding respectively to a plurality of selected cores, each output being indicative of one of at least three discrete time periods required for the magnitude of the output switching signal of a corresponding selected core to have a value less than a constant, predetermined threshold value.

19. The core memory as set forth in claim 18 above, wherein the time integral for the switching current for one command state of the data commands has a value of zero.

20. A core memory comprising:

a plurality of toroidal magnetic cores having magnetic flux associated therewith which is switched in response to a magnetomotive force greater than a coercive force of the cores;

a driver system responsive to read commands, write commands, address commands indicating selected cores, and multistate data commands, each data command commanding one of at least three discrete states, the driver system being inductively coupled to drive selected cores with first and opposite polarity switching currents having sufficient magnitude to induce a magnetomotive force in the selected cores which is greater than the coercive force thereof, the driver system responding to a write command by driving selected cores with a first polarity switching current in accordance with a commanded state, the time integral of the excess of the first polarity switching current over the current required to induce a coercive force in the cores having one of at least two nonzero discrete values, each discrete value corresponding to a different commanded data state, the driver system responding to a read command by driving selected cores with an opposite polarity switching current, the time integral of the excess of the opposite polarity switching current over the current required to induce a coercive force in the cores having a value greater than the greatest of the at least two nonzero discrete values; and a sensing system synchronized with opposite polarity switching currents connected to sense output switching signals generated by switching flux in selected cores in response to an opposite polarity switching current, the sensing system generating an output for each selected core indicative of one of at least two nonzero, discrete time periods required for the magnitude of the output switching signal to drop below a selected threshold value, each output signal representing one of at least three different data states.

21. The core memory as set forth in claim 20 above, wherein the plurality of toroidal magnetic cores comprises at least one two dimensional array of magnetic cores having at least 512 columns of cores with at least 1024 cores in each column.

22. The core memory as set forth in claim 21 above, wherein the cores are temperature stable cores having output switching signals with smallest peak amplitudes at least 70% as great as largest peak amplitudes over a temperature range of −25° C to +75° C when driven by long duration switching currents having a magnitude approximately 1.5 times the magnitude of current required to induce magnetomotive forces in the cores equal to the coercive force thereof.

23. The core memory as set forth in claim 21 above, wherein each core is a temperature stable core having an output switching signal with a smallest peak magnitude at least 80% as great as a largest peak magnitude over a temperature range of −25° C to +75° C when switched by long duration switching currents driving the core with a magentomotive force approximately 1.7 times the coercive force thereof.

24. The core memory as set forth in claim 23 above, wherein the smallest peak magnitude occurs near neither extreme of the −25° C to +75° C temperature range.

25. The core memory as set forth in claim 23 above, wherein the driver system includes at least 512 digit line conductors each inductively coupled to all of the cores of a different column along an approximately straight line and at least 1024 word line conductors each inductively coupled to one core from each column along an approximately straight line, the first polarity switching current being generated at each selected core by the additive coincidence of a partial select word line current and a partial select digit line current, and the opposite polarity switching current being generated at each selected core solely by a single word line current.

26. The core memory as set forth in claim 25 above, wherein the cores have an outside diameter of approximately 18 mils and are positioned along the digit line conductors on centers separated by not more than 10 mils.

27. The method of storing more than two information states in a toroid shaped core of homogeneous magnetic material comprising the steps of:

inductively switching a selected discrete portion of the flux in a toroid having substantially all of the permanent flux therein preswitched to a first magnetic state to a second magnetic state opposite the first state, the selected discrete portion of the flux being one of at least three different available discrete flux portions and being selected in response to a discrete data signal;

switching substantially all of the flux in the core to the first state with a current inductively coupling the core which has a predetermined amplitude waveform;

sensing a voltage pulse induced by the switching of flux in the core to the first state, said voltage pulse having initial and trailing edges as the magnitude of the voltage pulse increases and decreases respectively; and generating a discrete data signal indicating a stored information state in response to the time relationship of the trailing edge of the sensed voltage to a time reference.

28. The method of operating a magnetic core memory having a word conductor and a digit conductor inductively coupled to each core comprising the steps of:

writing a selected information state into a core having substantially all of the permanent magnetic flux therein oriented in a first direction by driving the core with coincident word conductor and digit conductor currents of a polarity tending to switch the flux of the core to a second direction opposite the first direction for a selected one of a plurality of predetermined time periods, each of which is of insufficient duration to switch substantially all of the permanent magnetic flux in the core to the second direction;

reading an information state from a core by driving the core with a word line read current of a magnitude, direction and polarity sufficient to switch substantially all of the permanent flux in the core to the first direction;

sensing the magnitude of a voltage signal on the digit conductor which inductively couples the core;

determining whether or not the sensed magnitude exceeds predetermined threshold magnitudes at a plurality of predetermined periods of time subsequent to initiation of the word line read current; and generating an output signal indicative of the number of determinations of the sensed magnitude exceeding a threshold magnitude.

29. The method of operating each core of a toroidal core memory having a plurality of cores, each of which requires a magnetomotive force greater than a coercive force thereof to be induced therein in order to switch an appreciable amount of permanent magnetic flux, as a multistate storage element for the storage of a selected one of at least three possible data states comprising the steps of:

storing a selected data state in a selected core having substantially all of the permanent flux therein in a first polarity of magnetization by driving said core with a write current inductively coupled thereto with a polarity tending to switch the magnetic flux of the core to a second state of magnetization opposite the first state, the time integral of the excess of the magnitude of the write current over the magnitude of a current required to induce a coercive force in the core having one of at least three predetermined discrete values, the one discrete value being dependent upon the information state which is to be stored; and retrieving stored information from a selected core by (a) driving the selected core with a read current inductively coupled thereto with a polarity tending to switch the flux of the core to the first state of magnetization, the time integral of the excess of the magnitude of the read current over the magnitude of current required to induce a coercive force in a core being greater than the time integral of the excess of the magnitude of a write current over the coercive force inducing current during a most recently preceding storing operation for the core, (b) sensing a magnitude of an output switching signal generated by the switching of magnetic flux in the selected core as the core is driven with the read current, and (c) detecting a one of at least three discrete time intervals during which the magnitude of the sensed output switching signal becomes less than a selected threshold value.

30. The method as set forth in claim 29 above, wherein the step of retrieving further includes the step of generating an output data signal indicative of the one discrete time period during which the magnitude of the sensed output switching signal becomes less than the selected threshold value.

31. The method as set forth in claim 30 above, wherein the step of generating includes the step of counting successive discrete time intervals during which the magnitude of the sensed output switching signal remains above the selected threshold value.

* * * * *